United States Patent
Iizumi et al.

(10) Patent No.: US 11,982,845 B2
(45) Date of Patent: May 14, 2024

(54) INGRESS-PROTECTED OPTICAL FIBER CONNECTOR ASSEMBLY

(71) Applicant: Senko Advanced Components, Inc., Marlborough, MA (US)

(72) Inventors: Kenji Iizumi, Tokyo (JP); Kazuyoshi Takano, Tokyo (JP); Paul Newbury, Ashland, MA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/678,640

(22) Filed: Feb. 23, 2022

(65) Prior Publication Data

US 2022/0269013 A1    Aug. 25, 2022

Related U.S. Application Data

(60) Provisional application No. 63/196,070, filed on Jun. 2, 2021, provisional application No. 63/153,289, filed on Feb. 24, 2021.

(51) Int. Cl.
*G02B 6/38* (2006.01)

(52) U.S. Cl.
CPC ......... *G02B 6/3849* (2013.01); *G02B 6/3825* (2013.01); *G02B 6/3887* (2013.01)

(58) Field of Classification Search
CPC .. G02B 6/3825; G02B 6/3849; G02B 6/3887; G02B 6/3888
See application file for complete search history.

(56) References Cited

U.S. PATENT DOCUMENTS

| | | | | |
|---|---|---|---|---|
| 5,493,626 A | * | 2/1996 | Schultz | G02B 6/4427 385/12 |
| 6,962,445 B2 | * | 11/2005 | Zimmel | G02B 6/3897 439/587 |
| 8,917,967 B2 | * | 12/2014 | Kempeneers | G02B 6/3894 385/139 |
| 9,482,825 B1 | | 11/2016 | Gniadek | |
| 10,948,664 B2 | | 3/2021 | Takano et al. | |
| 11,092,756 B2 | | 8/2021 | Takano | |
| 11,275,221 B2 | | 3/2022 | Takano et al. | |
| 11,307,359 B2 | | 4/2022 | Takano et al. | |

* cited by examiner

*Primary Examiner* — Omar R Rojas

(57) ABSTRACT

In an ingress-protected fiber optic connector assembly, an optical fiber plug mates with a receptacle at a bulkhead adapter and an ingress-protected housing assembly couples to the bulkhead adapter to enclose the optical fiber plug. The ingress-protected housing includes an outer housing and a compressible cable seal. The outer housing is rotatable to advance the outer housing, simultaneously compressing the compressible cable seal and fastening the housing assembly to the bulkhead adapter. The outer housing can have a plurality of coupling positions at which the cable seal is compressed with a different amount of compression force. A non-sealing cable clamp can transfer tension on the cable to the bulkhead adapter.

20 Claims, 50 Drawing Sheets

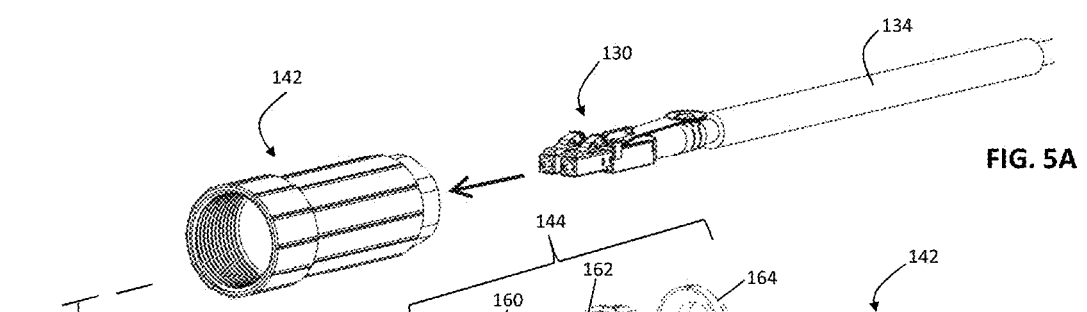
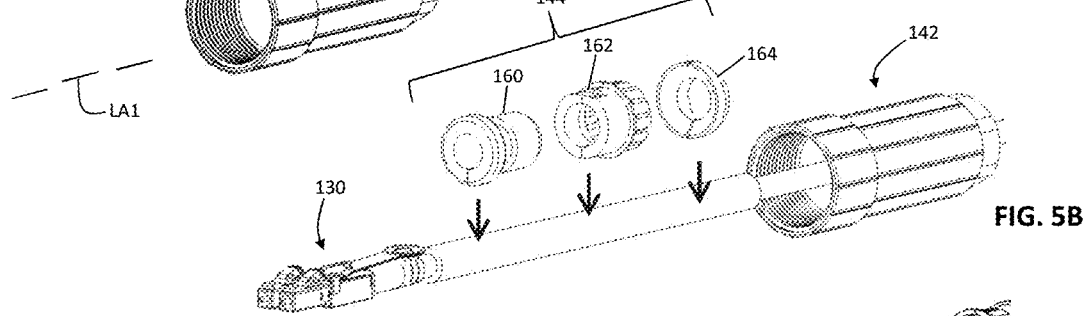
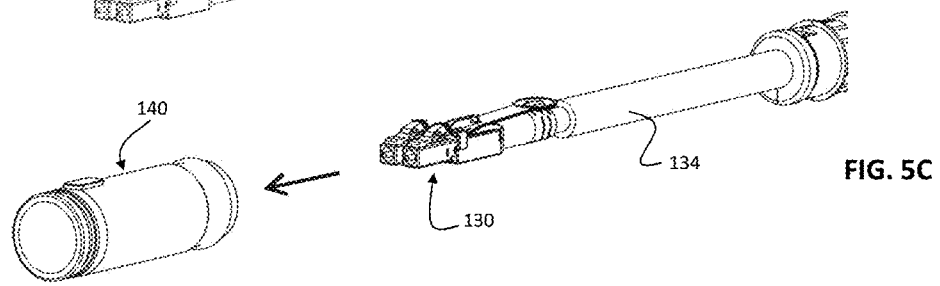

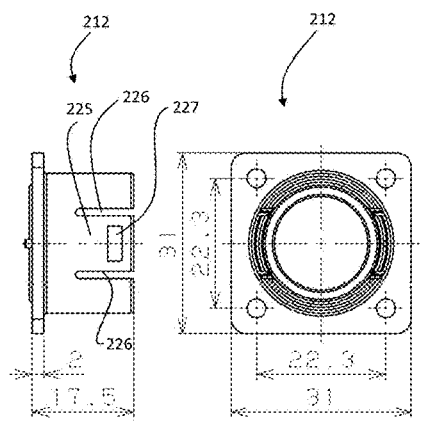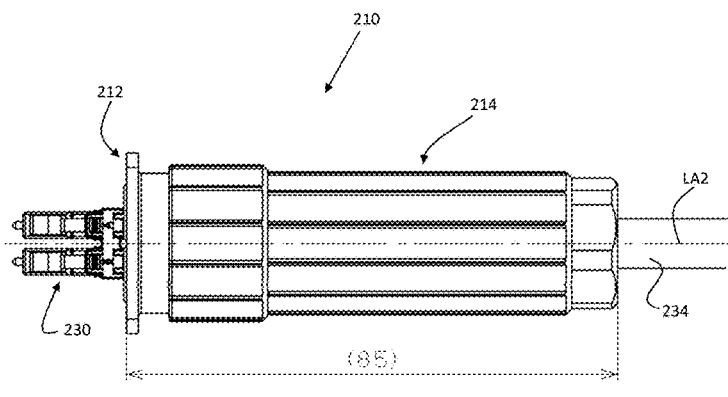
FIG. 10A  FIG. 10B  FIG. 11A

INGRESS-PROTECTED OPTICAL FIBER CONNECTOR ASSEMBLY

CROSS-REFERENCE TO RELATED APPLICATIONS

This application claims priority to U.S. Provisional Patent Application No. 63/153,289, filed Feb. 24, 2021, and U.S. Provisional Patent Application No. 63/196,070, filed Jun. 8, 2021, each of which is hereby incorporated by reference in its entirety.

FIELD

The present disclosure generally relates to an ingress-protected optical fiber connector assembly, such as an ingress-protected optical fiber connector configured for connection to a bulkhead adapter and/or a field-installed ingress protected optical fiber connector assembly.

BACKGROUND

The prevalence of the Internet has led to unprecedented growth in communication networks. Consumer demand for service and increased competition has caused network providers to continuously find ways to improve quality of service while reducing cost. Optical fiber communication networks are sometimes preferred for their speed, bandwidth, and reliability. But in some respects, optical fiber networks can be more challenging to implement than copper-based communication networks. For example, copper conductors can be connected with much less precision than optical fibers at various points within a communication network.

One area of interest in the field of fiber optic communication networks is "fiber to the x" ("FTTX"), the "last mile" portion of the fiber network that connects directly to end user premises or telecommunications equipment. The industry is interested in FTTX solutions that can be readily adapted to the requirements of particular network and that have a low labor cost to deploy.

Some FTTX deployments require the terminal end of an optical fiber to be connected in an outdoor environment, or other potentially harsh environment. In these instances, systems for making ingress-protected optical connections are desirable to protect the integrity of the field connection of the optical fiber.

SUMMARY

In one aspect, an ingress-protected fiber optic connector assembly comprises an optical fiber plug configured for terminating an optical fiber cable and for mating with a receptacle at a bulkhead adapter. An ingress-protected housing assembly is configured to couple to the bulkhead adapter and enclose the optical fiber plug mated with the receptacle. The ingress-protected housing assembly comprises an outer housing and a compressible cable seal. The outer housing is rotatable in a coupling direction about a longitudinal axis relative to the optical fiber plug to advance the outer housing along the longitudinal axis from an uncoupled position to a coupled position in relation to the bulkhead adapter. Rotating the outer housing in the coupling direction to advance the outer housing along the longitudinal axis from the uncoupled position to the coupled position simultaneously (1) compresses the compressible cable seal against the optical fiber cable to make a fluid seal between the ingress-protected housing assembly and the optical fiber cable and (2) fastens the ingress protected housing assembly to the bulkhead adapter so that the rotatable outer housing must be counter-rotated in an uncoupling direction about the longitudinal axis to separate the ingress-protected housing assembly from the bulkhead adapter.

In another aspect, a method of making an ingress-protected fiber optic connection comprises plugging an optical fiber plug into a receptacle at a bulkhead adapter and rotating an outer housing of an ingress-protected housing assembly in a coupling direction relative to the optical fiber plug to simultaneously (1) compress a compressible cable seal of the ingress-protected housing assembly against the optical fiber cable to make a fluid seal between the ingress-protected housing assembly and the optical fiber cable and (2) fasten the ingress protected housing assembly to the bulkhead adapter so that the rotatable outer housing must be counter-rotated in an uncoupling direction about the longitudinal axis to separate the ingress-protected housing assembly from the bulkhead adapter.

In another aspect, an ingress-protected fiber optic connector assembly comprises an optical fiber plug configured for terminating an optical fiber cable and for mating with a receptacle at a bulkhead adapter. An ingress-protected housing assembly is configured to couple to the bulkhead adapter and enclose the optical fiber plug mated with the receptacle. The ingress-protected housing assembly comprises an outer housing and a compressible cable seal. The outer housing is configured to couple to the bulkhead adapter at a plurality of coupling positions spaced apart along the longitudinal axis. The outer housing is configured to compress the compressible cable seal against the optical fiber cable with a different amount of compression force at each of the plurality of coupling positions such that the amount of compression force used to make a fluid seal between the ingress-protected housing assembly and the optical fiber cable is selectable by adjustment of the outer housing between the plurality of coupling positions.

In another aspect, an optical fiber connector assembly comprises an optical fiber plug configured for terminating an optical fiber cable and for mating with a receptacle at a bulkhead adapter. A rugged housing assembly is configured to couple to the bulkhead adapter and enclose the optical fiber plug mated with the receptacle. The rugged housing assembly comprises a housing configured to mate with the bulkhead adapter. A cable seal is configured to seal an interface between the housing and the optical fiber cable. A non-sealing cable clamp is configured to clamp onto the optical fiber cable such that movement of the optical fiber cable in relation to the cable clamp is inhibited. The cable clamp is configured to interface with the housing such that, when the optical fiber plug is mated with the receptacle and the outer housing is coupled to the bulkhead adapter, tension on the cable is transferred via the cable clamp to the bulkhead adapter and transfer of tension to the optical fiber plug and receptacle is inhibited.

Other aspects will be in part apparent and in part pointed out hereinafter.

BRIEF DESCRIPTION OF THE DRAWINGS

FIGS. 5A-5C are a series of exploded perspectives of the system of FIG. 2A illustrating a sequence of steps of field-installing the ingress-protected connector assembly;

FIG. 10A is a top plan view of the bulkhead adapter of the connection system of FIG. 8A, showing exemplary dimensions in mm;

FIG. 10B is an end elevation of the bulkhead adapter, showing exemplary dimensions in mm;

Figure 2A:
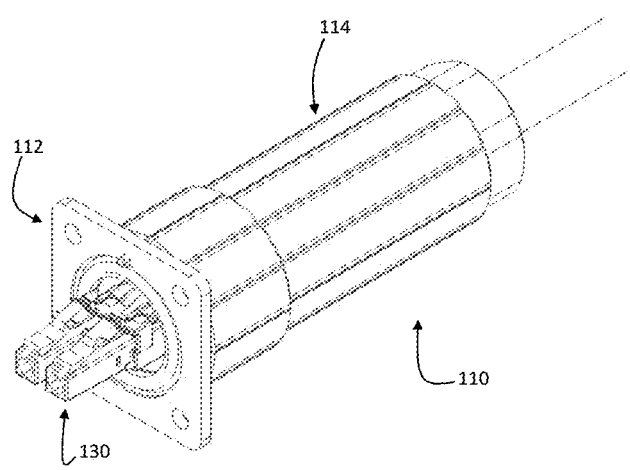
FIG. 2A is a perspective of a first embodiment of an ingress-protected bulkhead connection system in accordance with the present disclosure.
Figure 2B:
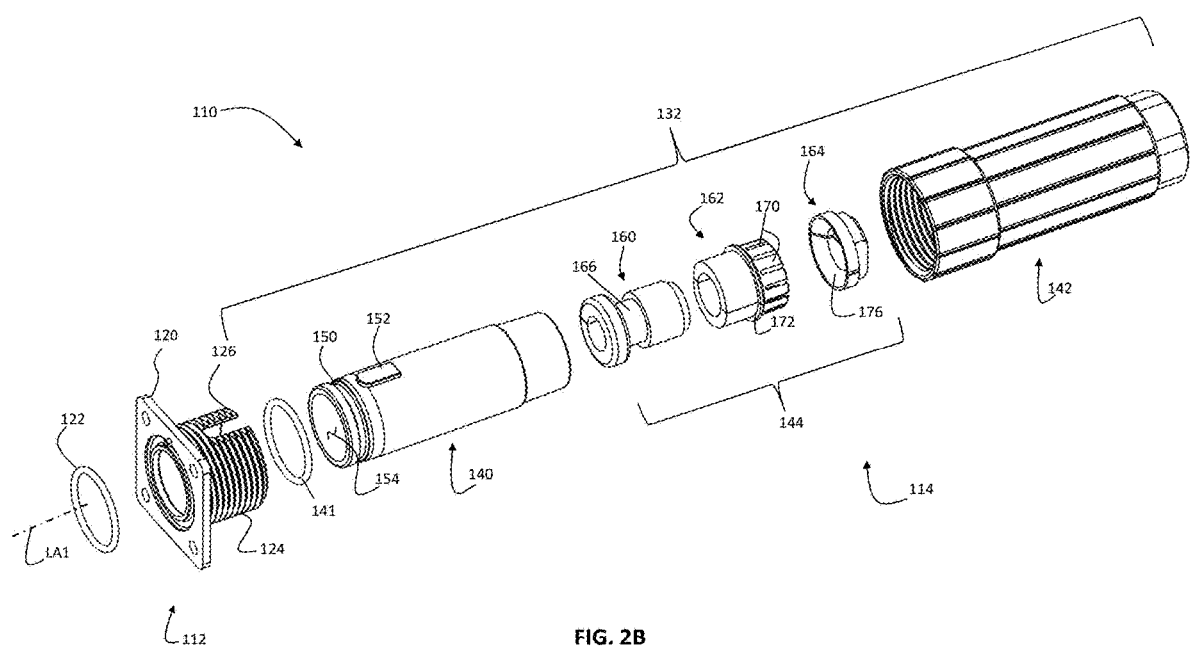
FIG. 2B is an exploded perspective of the system of FIG. 2A with a plug and cable removed.
Figure 3A:
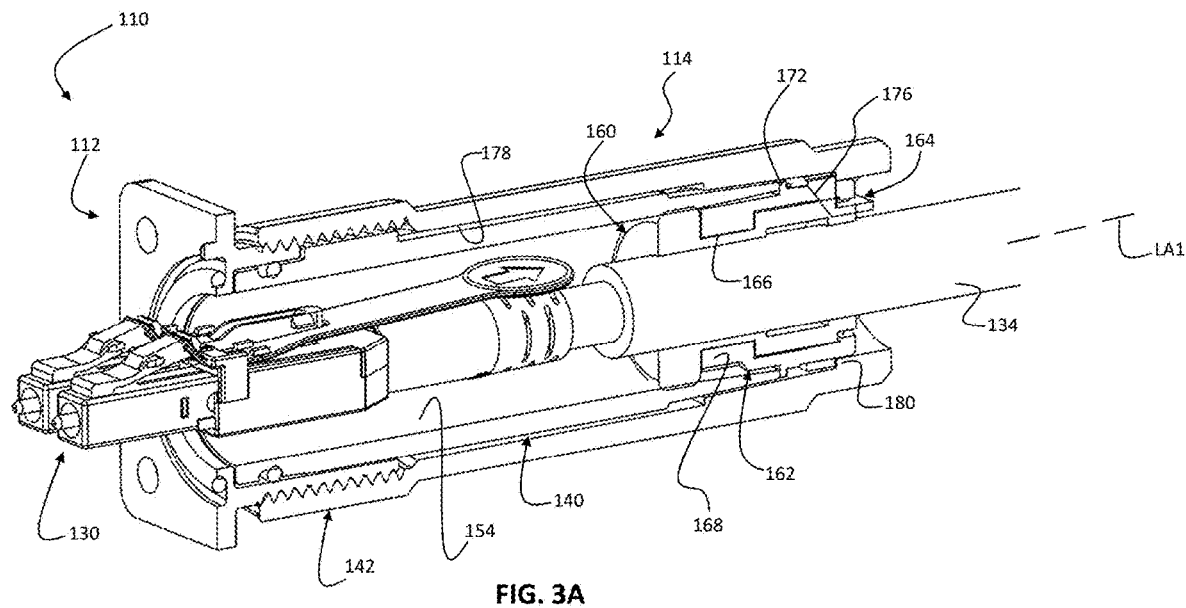
FIG. 3A is a perspective of the system of FIG. 2A shown in longitudinal section.
Figure 3B:
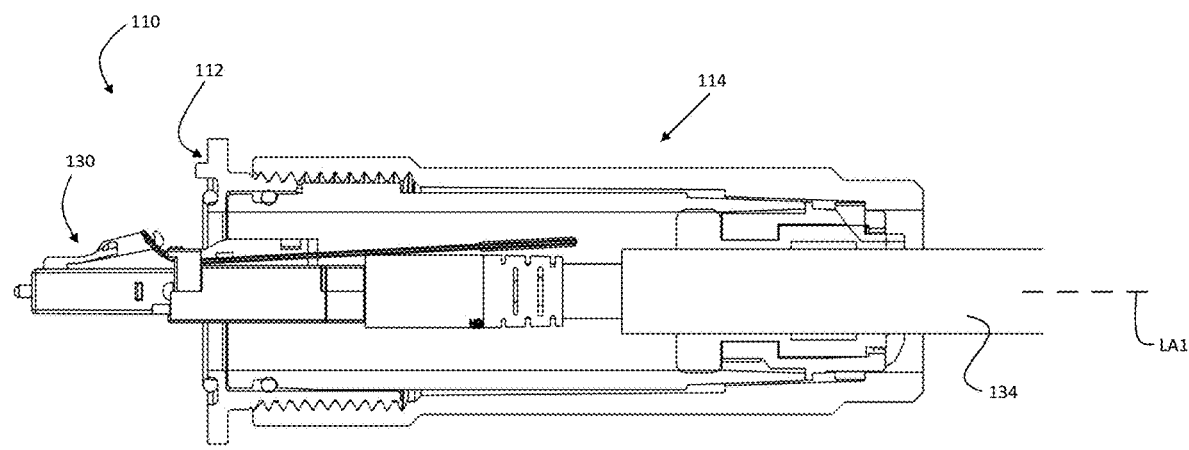
FIG. 3B is a longitudinal section of the system of FIG. 2A.
Figure 8A:
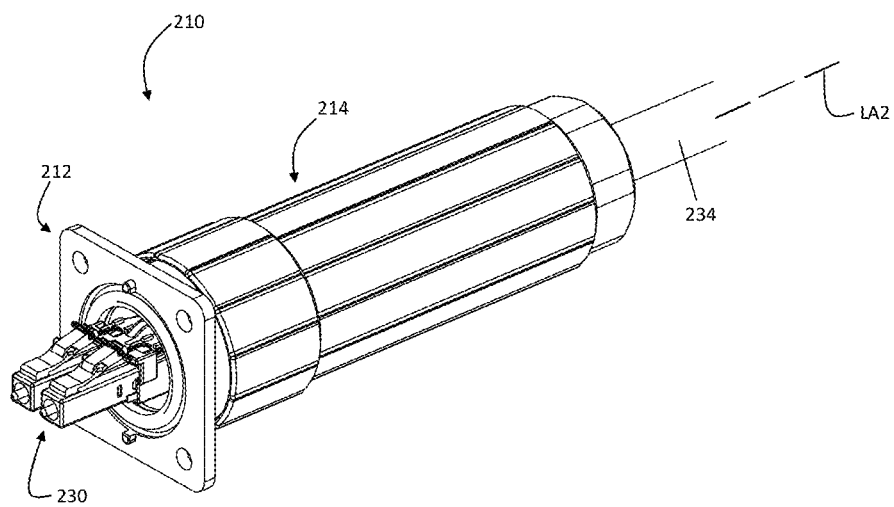
FIG. 8A is a perspective of a second embodiment of an ingress-protected bulkhead connection system in accordance with the present disclosure.
Figure 8B:
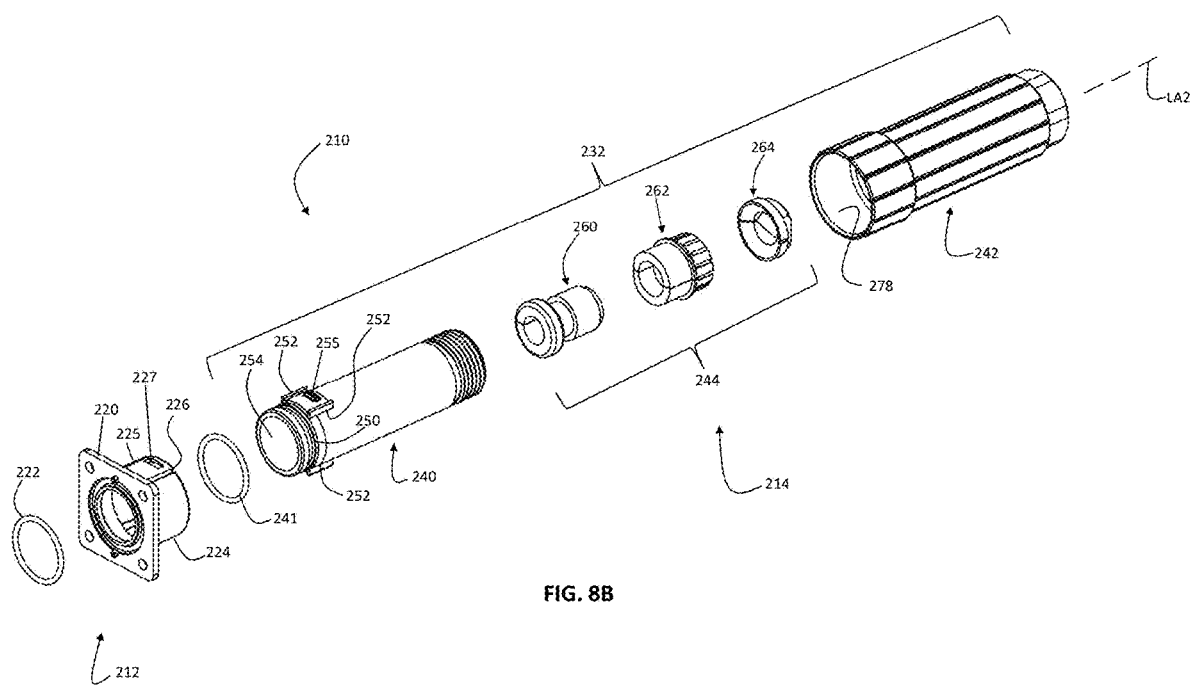
FIG. 8B is an exploded perspective of the system of FIG. 8A with a plug and cable removed.
Figure 9:
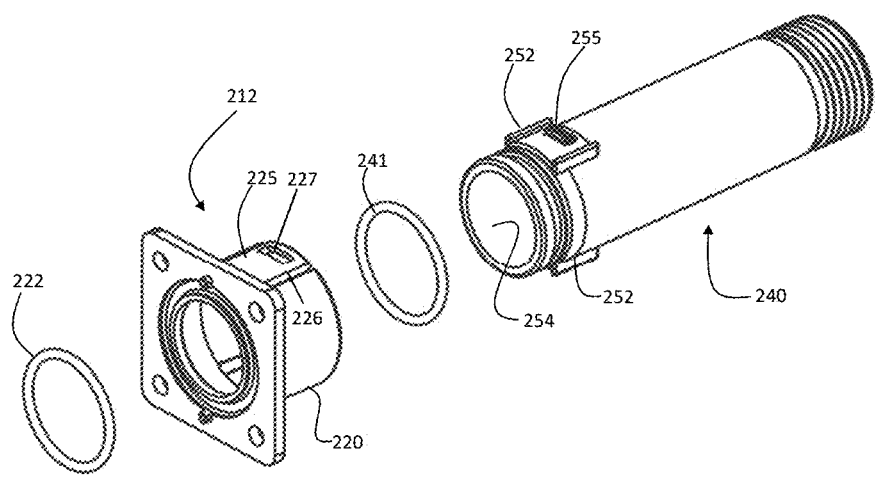
FIG. 9 is an exploded perspective of a subassembly of the system of FIG. 8A including a bulkhead adapter and an inner housing of an ingress-protected housing assembly of an ingress-protected connector assembly thereof.
Figure 11B:
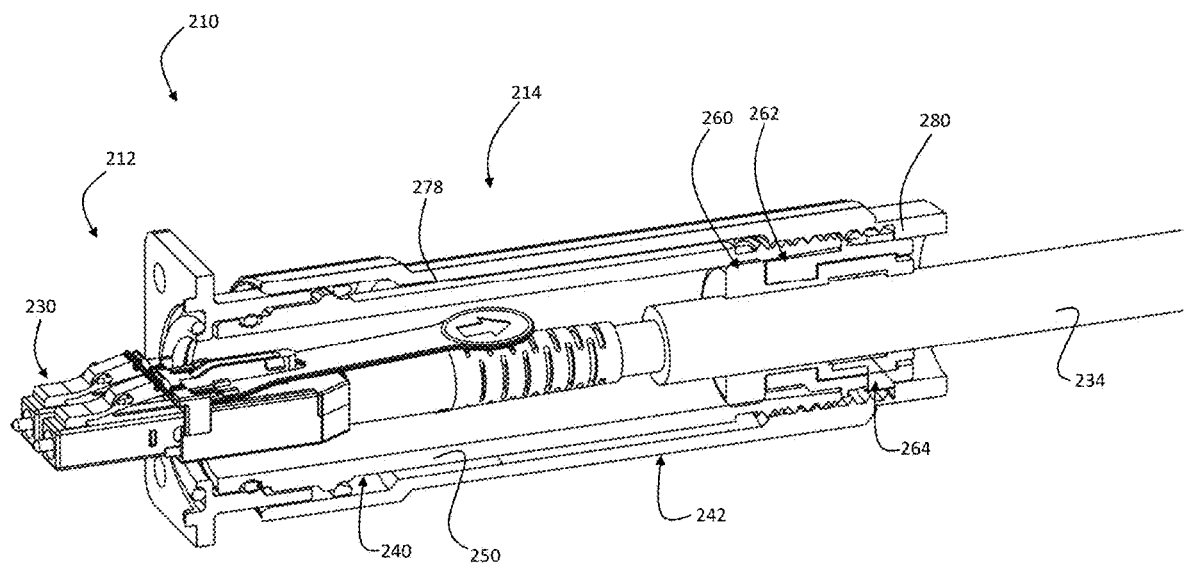
FIG. 11A is a top plan view of the connection system of FIG. 8A, showing exemplary dimensions in mm.
Figure 12:
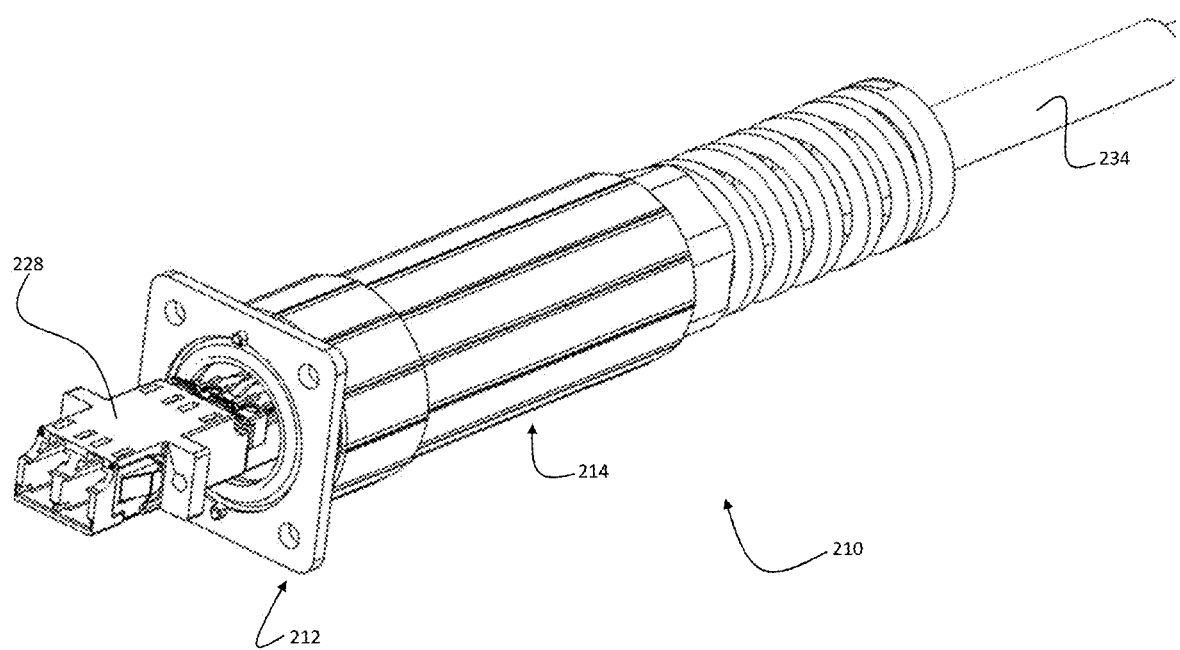
Figure 13:
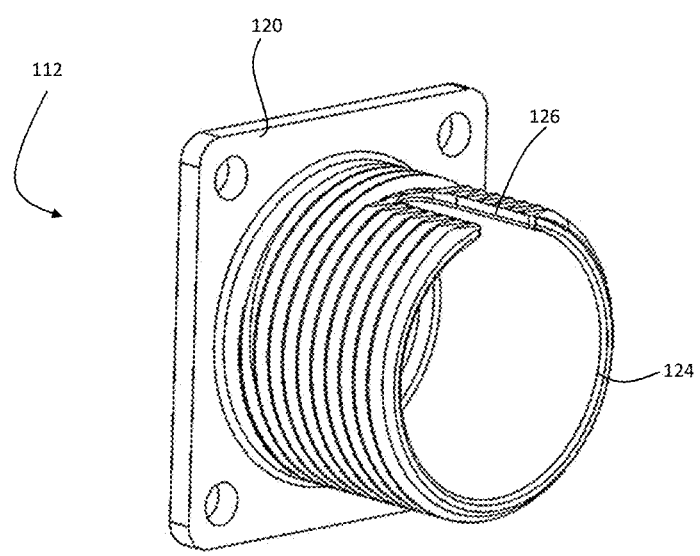
Figure 14:
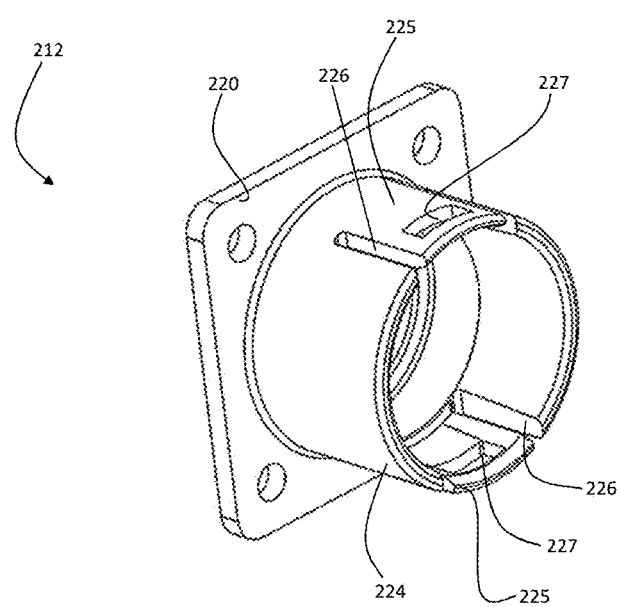
Figure 15:
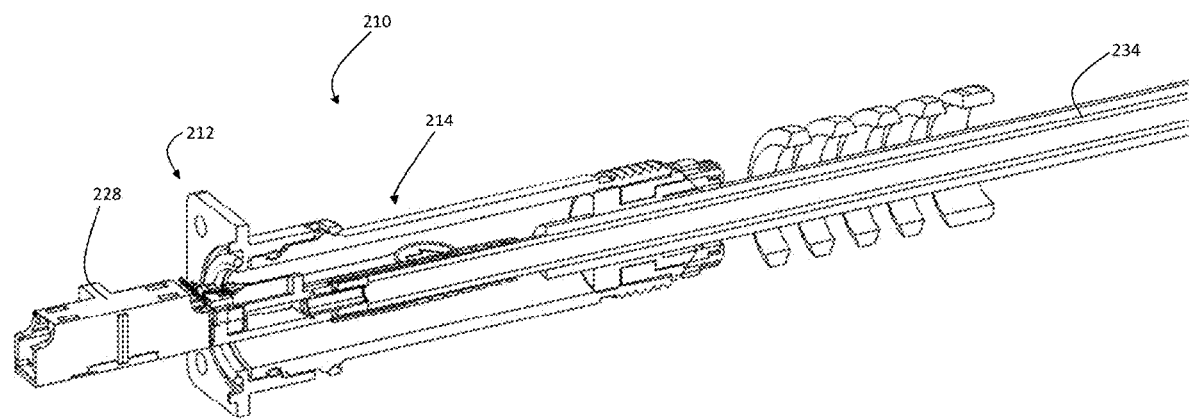
Figure 16A:
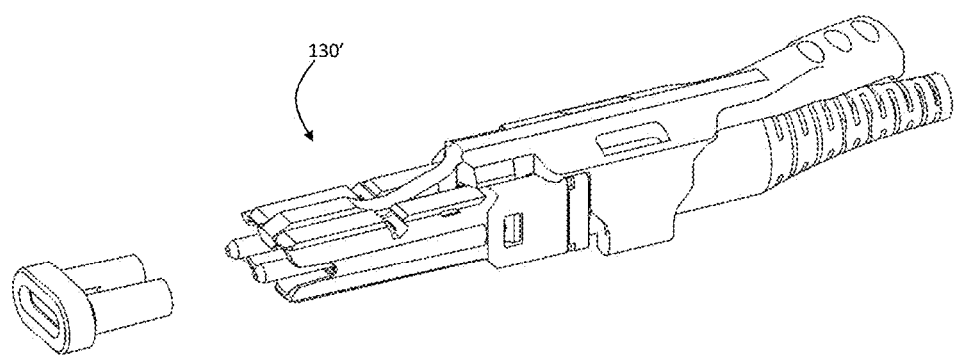
Figure 16B:
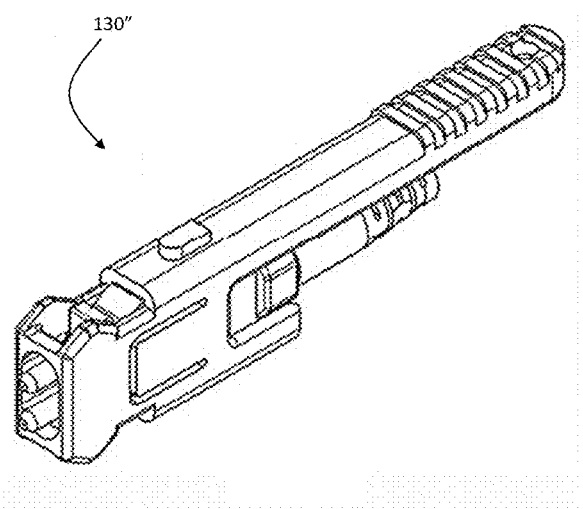
Figure 17:
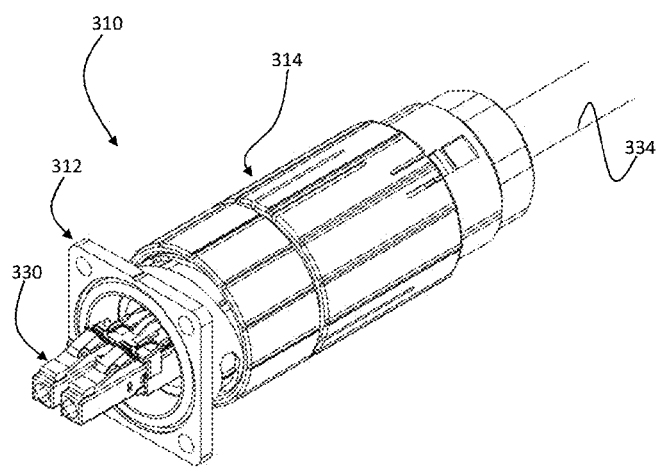
Figure 18:
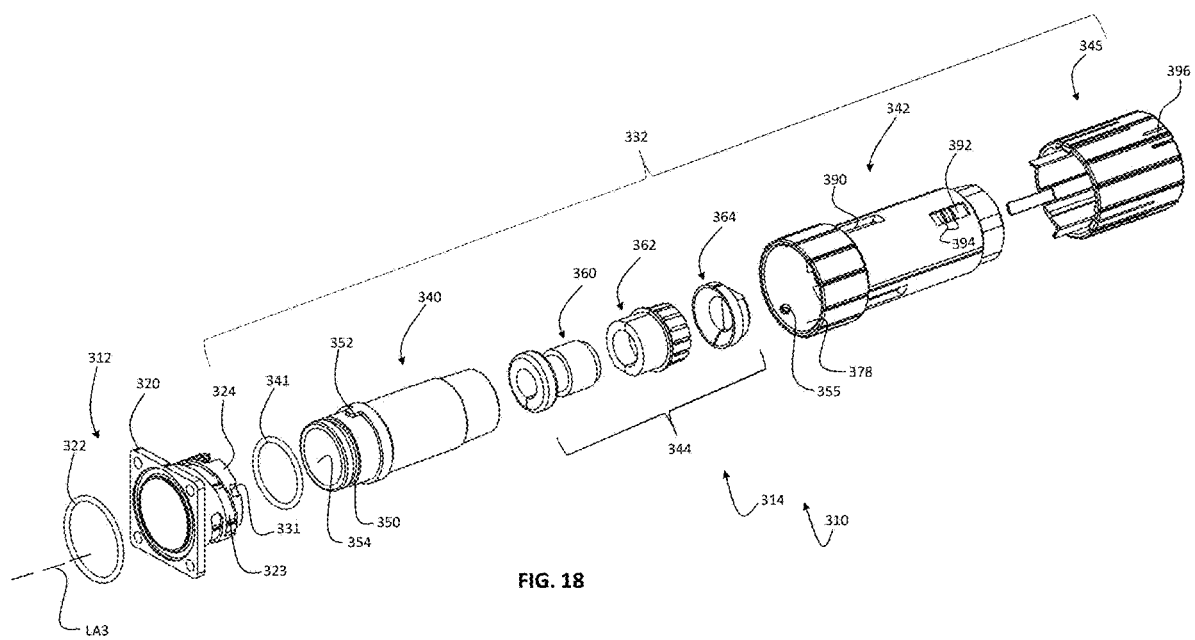
Figure 19:
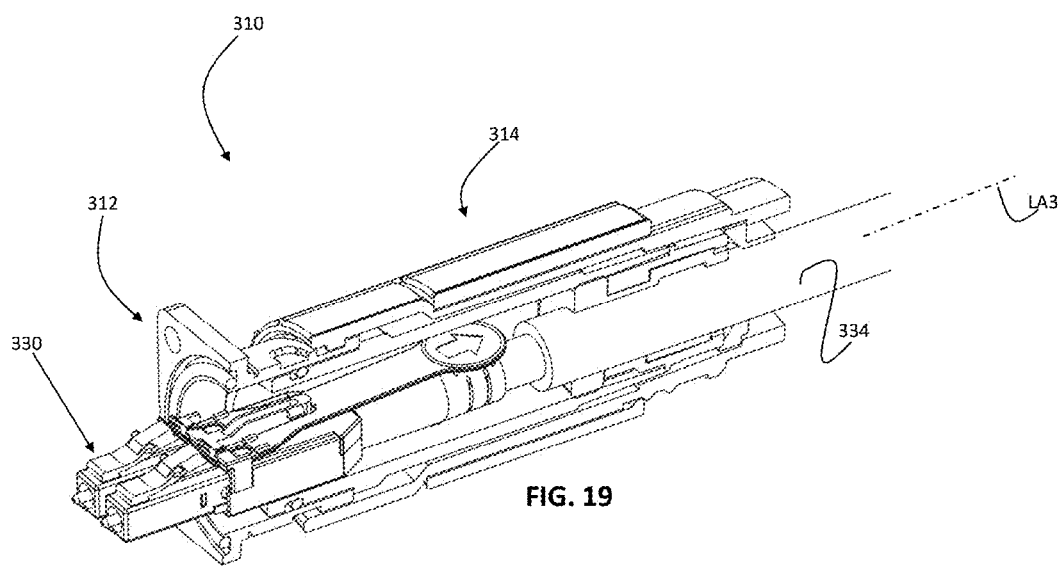
Figures 20, 21:
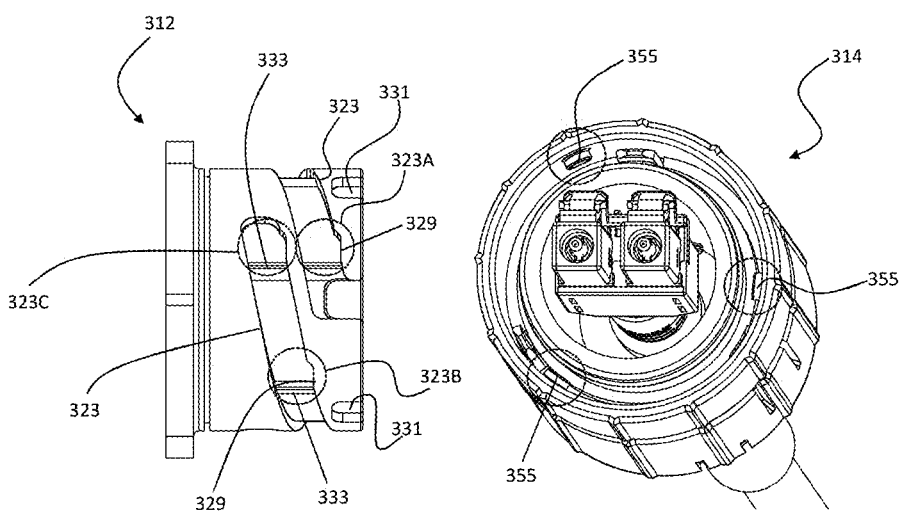
Figure 22:
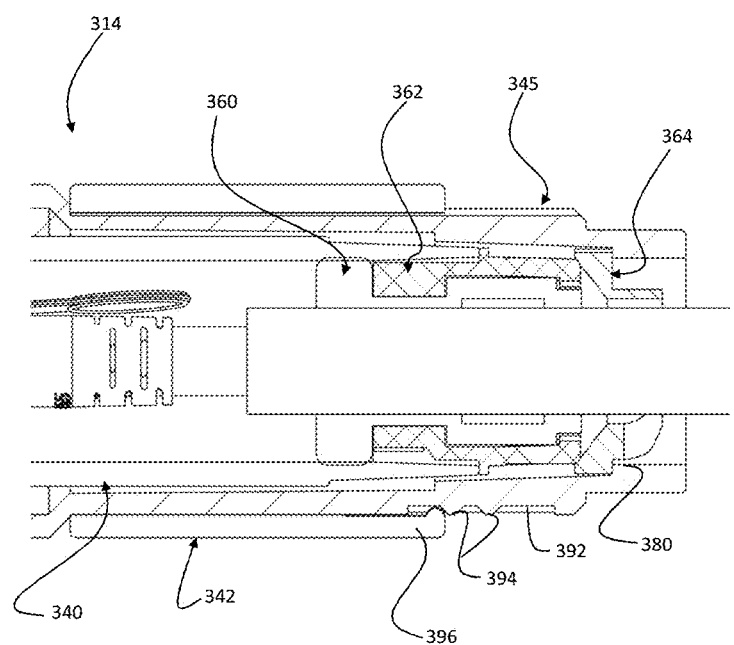
Figure 23:
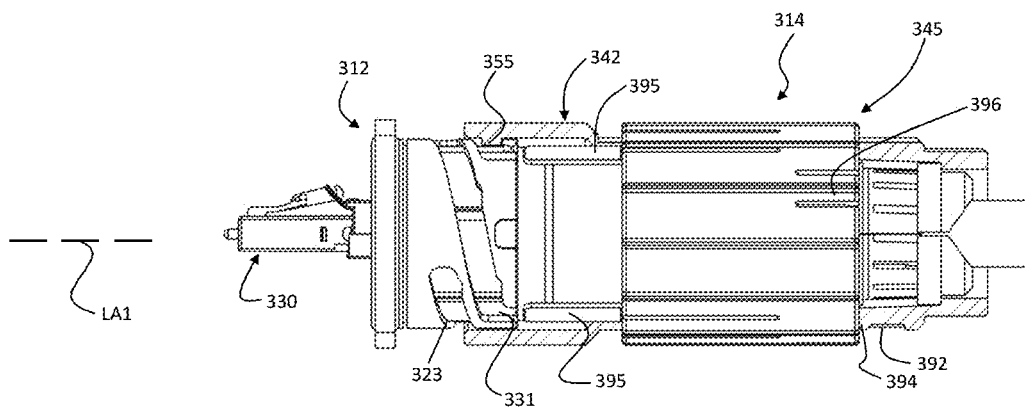
Figure 24:
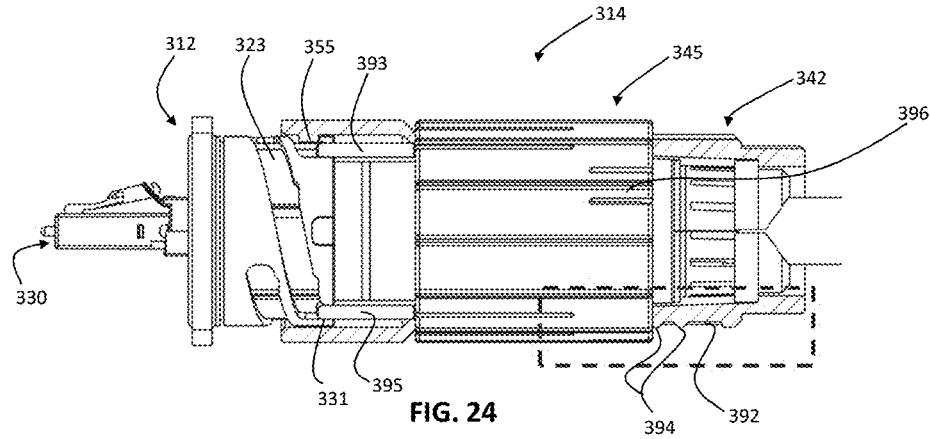
Figure 25:
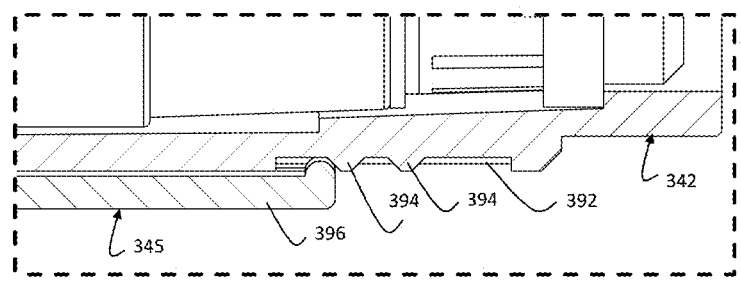
Figure 26:
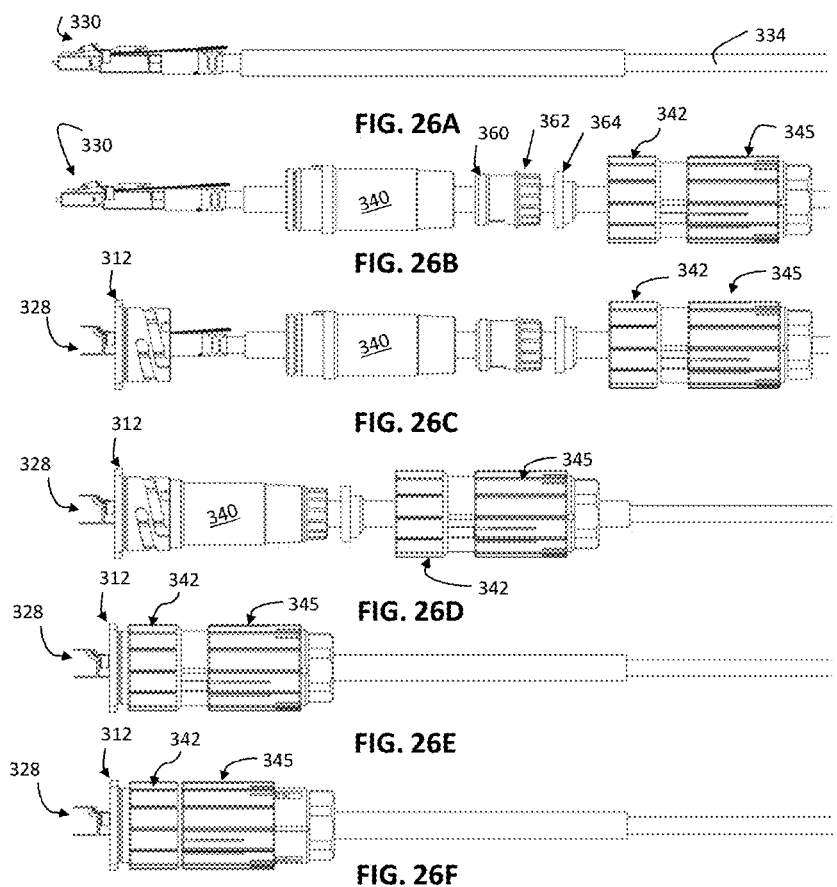
Figure 27:
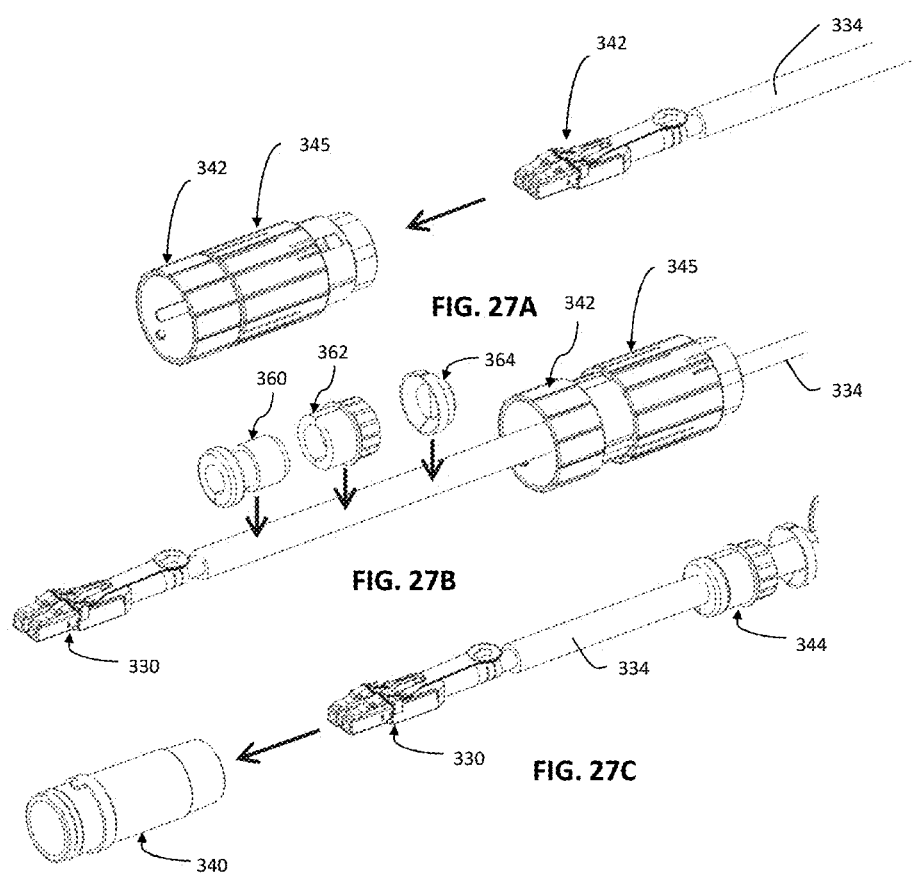
Figure 28:
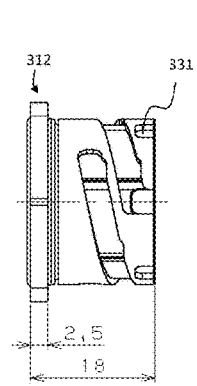
Figure 29:
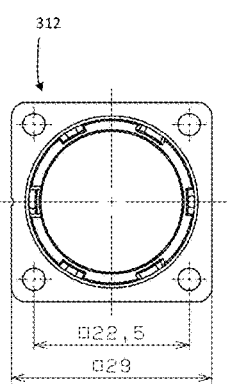
Figure 30:
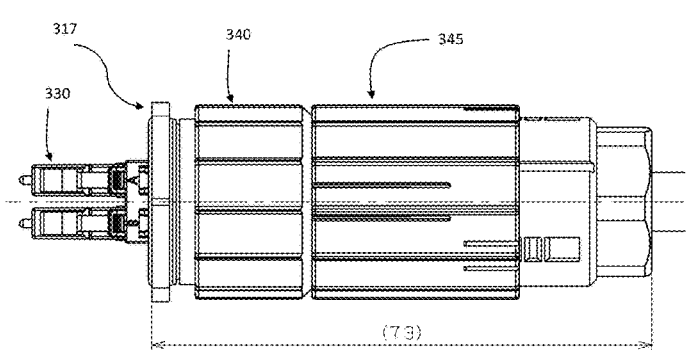
Figure 31:
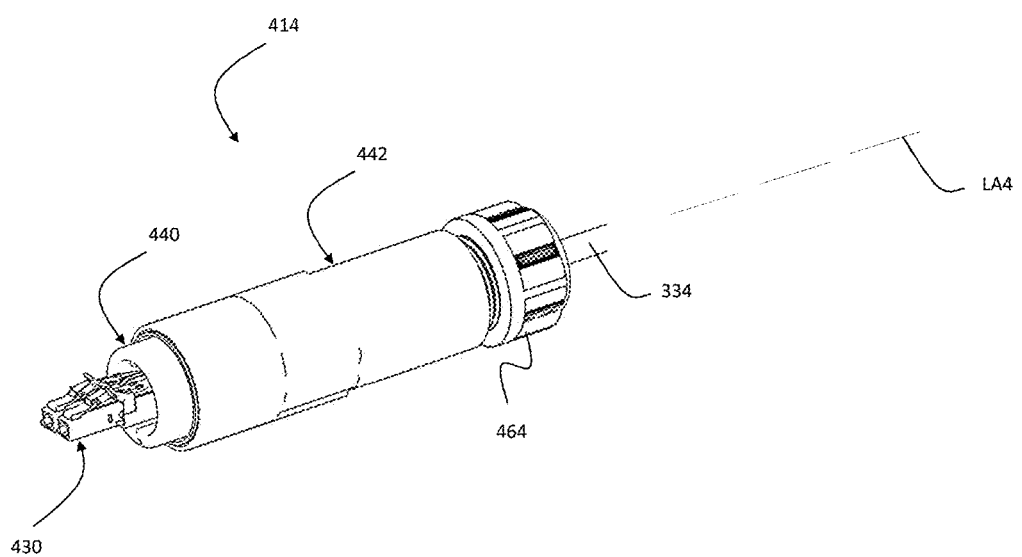
Figure 32:
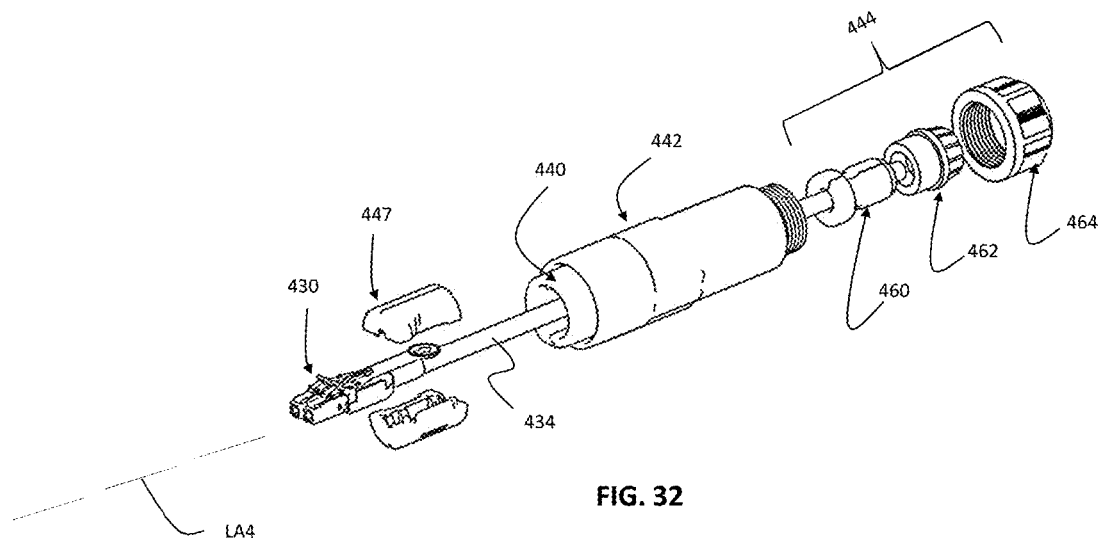
Figure 36:
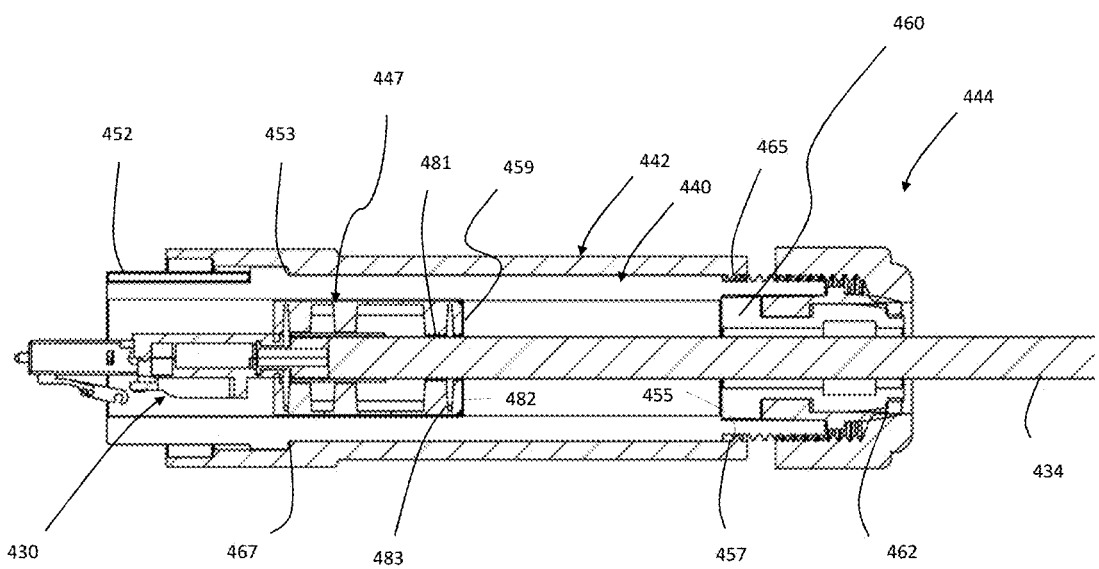
Figure 37:
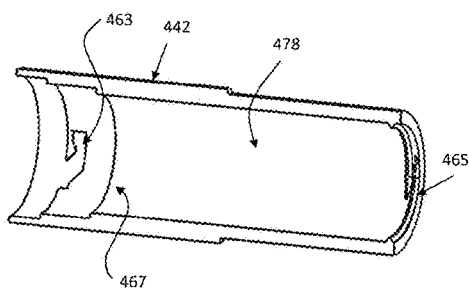
Figure 38:
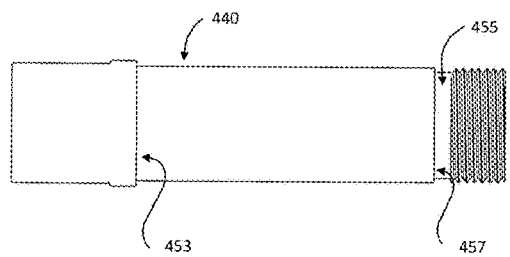
Figure 39:
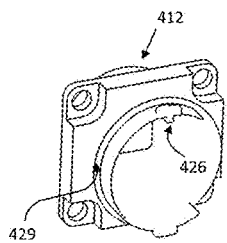
Figure 40:
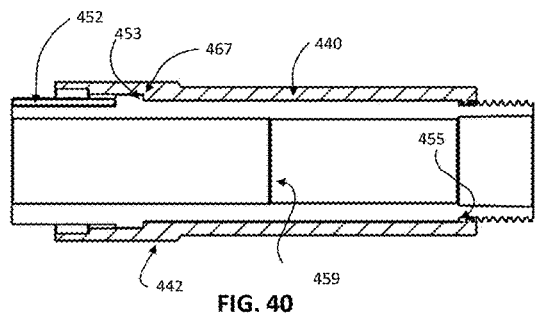
Figure 41:
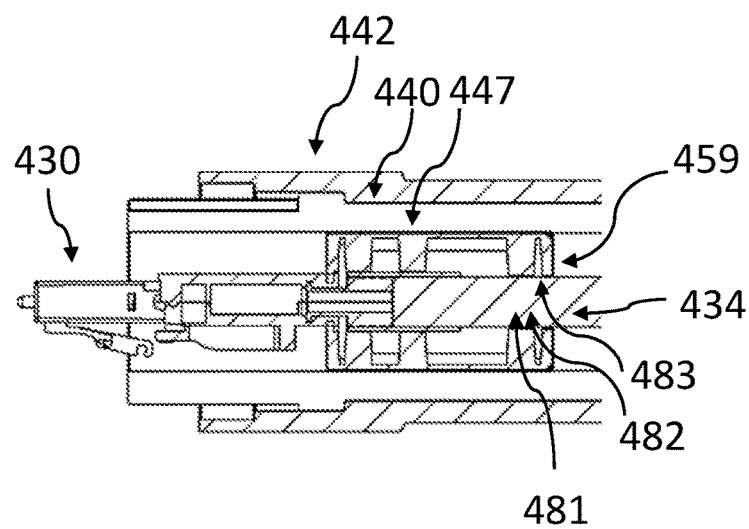
Figure 42:
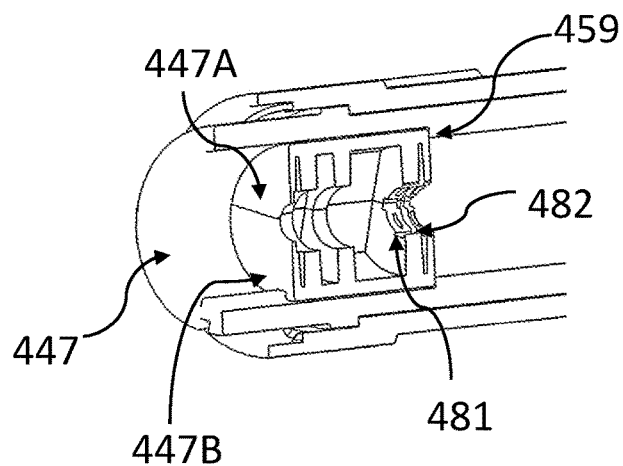
Figure 43:
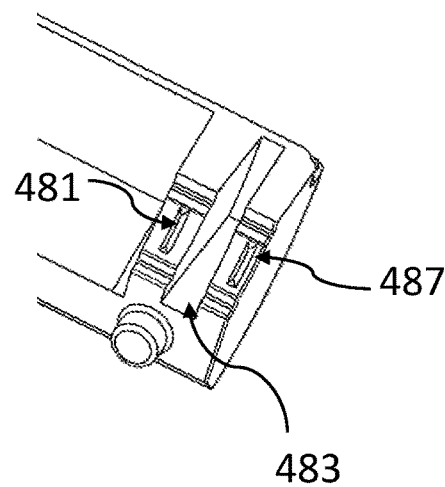
Figure 44:
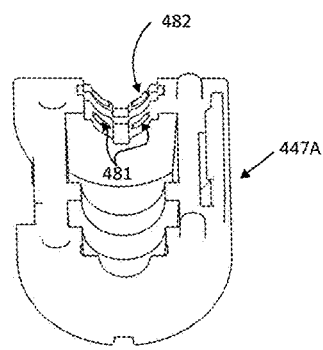
Figure 45:
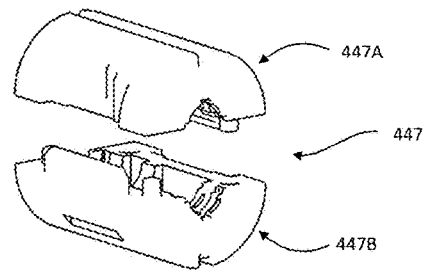
Figure 46:
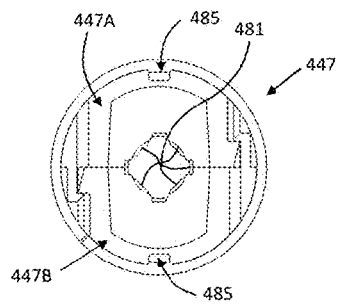
Figure 47:
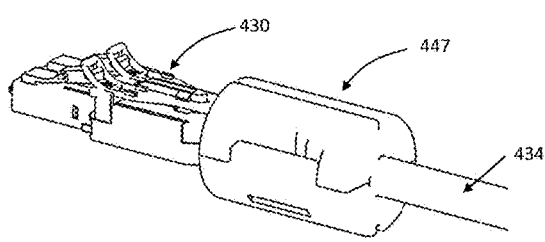
Figure 47A:
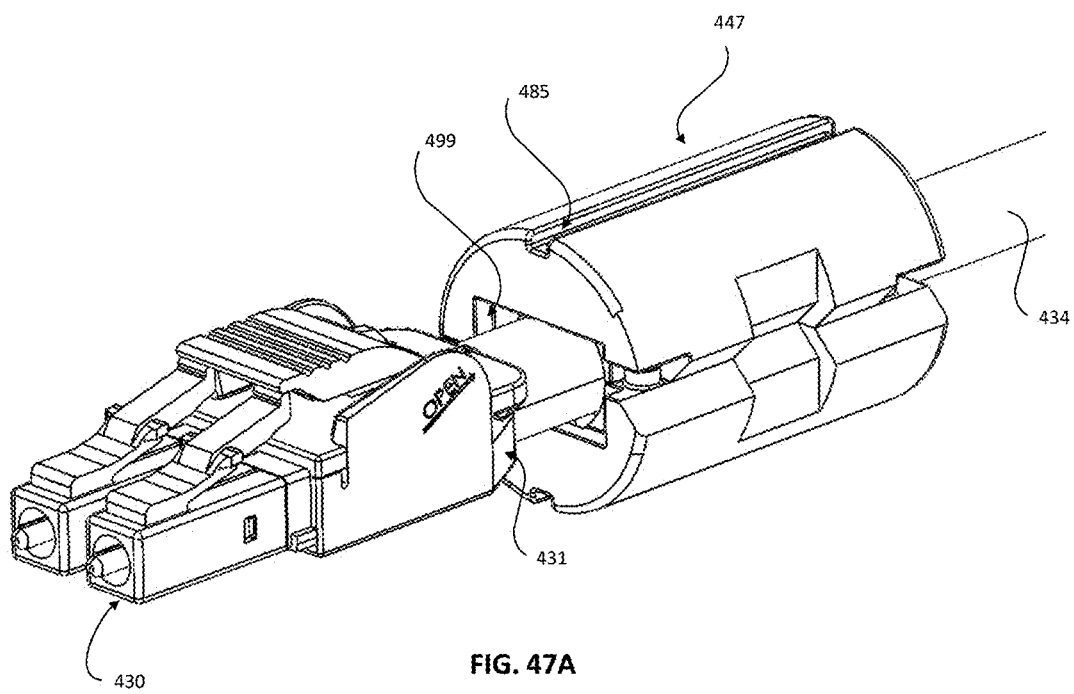
Figure 47B:
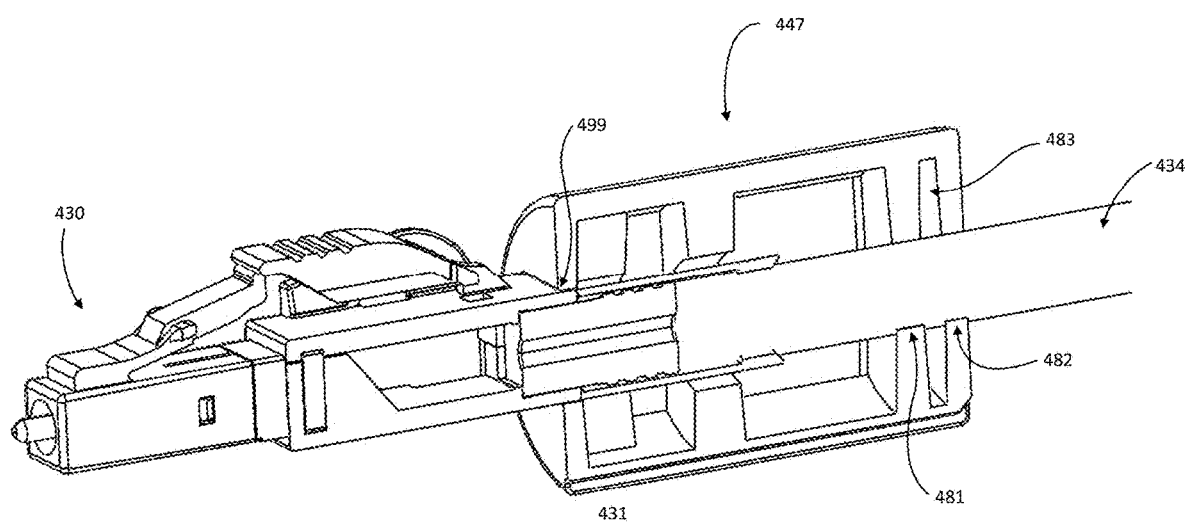
Figure 48:
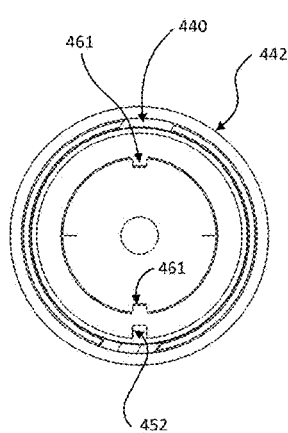
Figure 49:
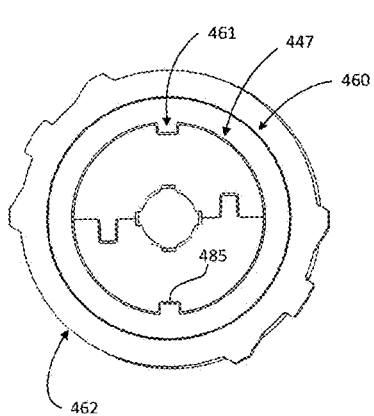
Figure 50:
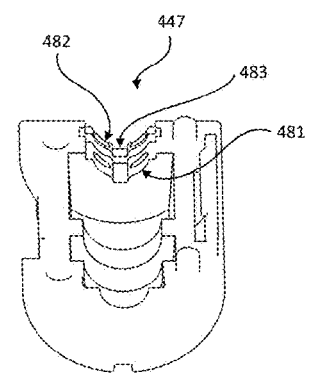
Figure 51:
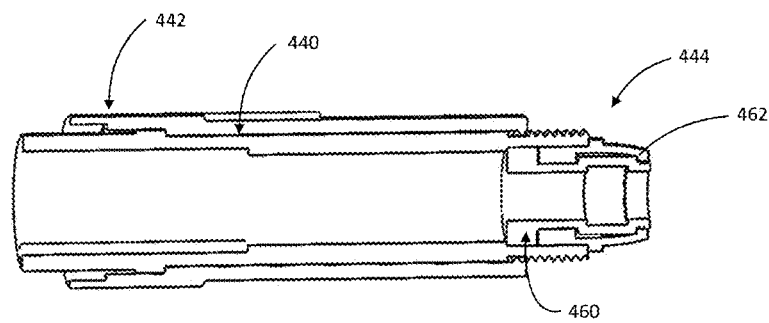
Figure 52:
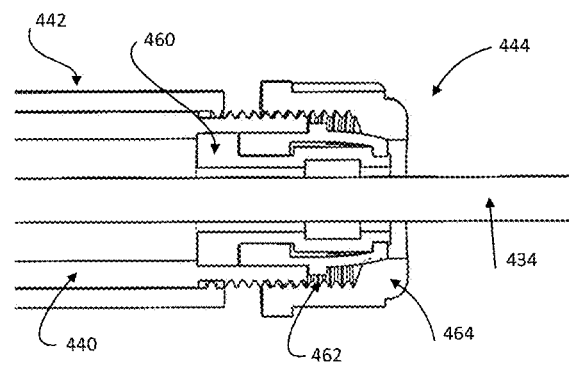
Figure 53:
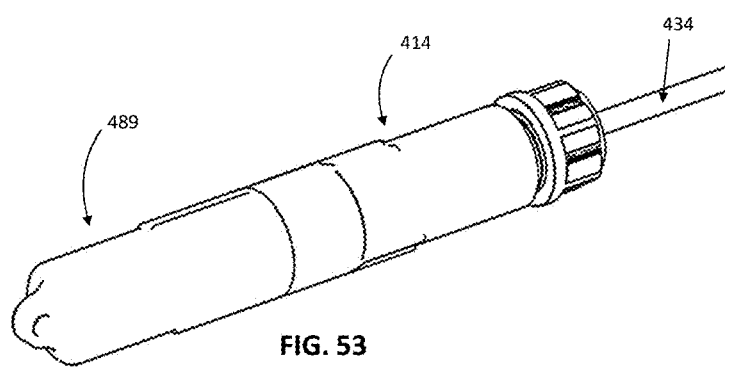
Figure 54:
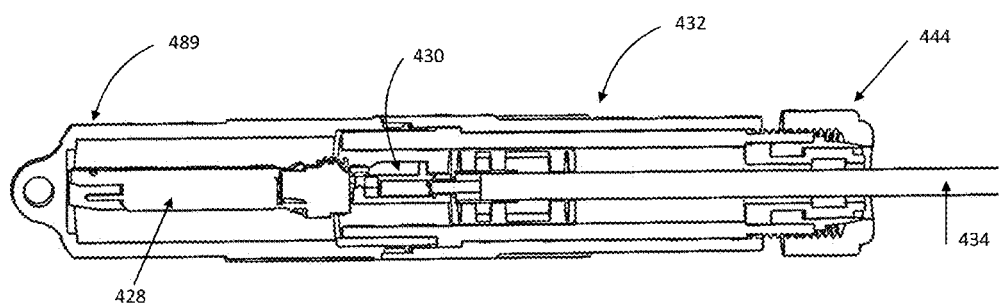
Figure 55:
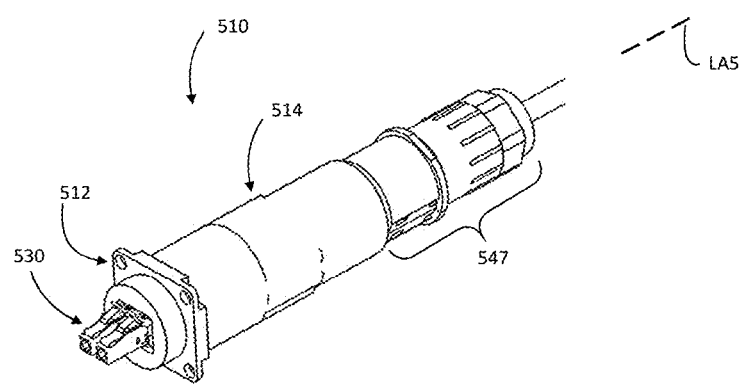
Figure 56:
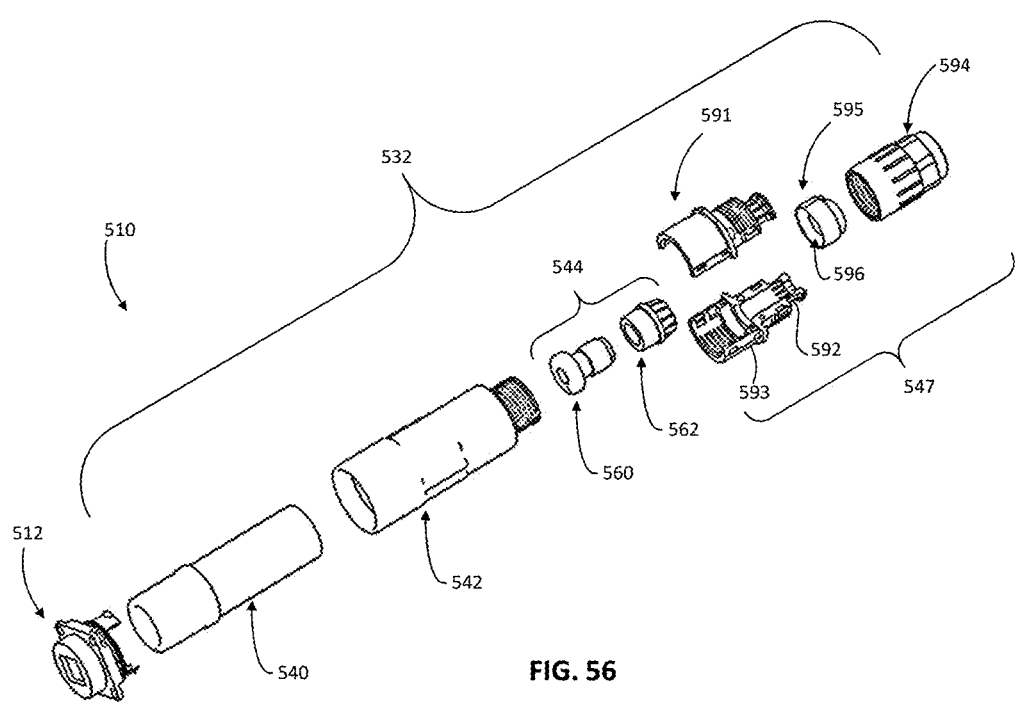
Figure 57:
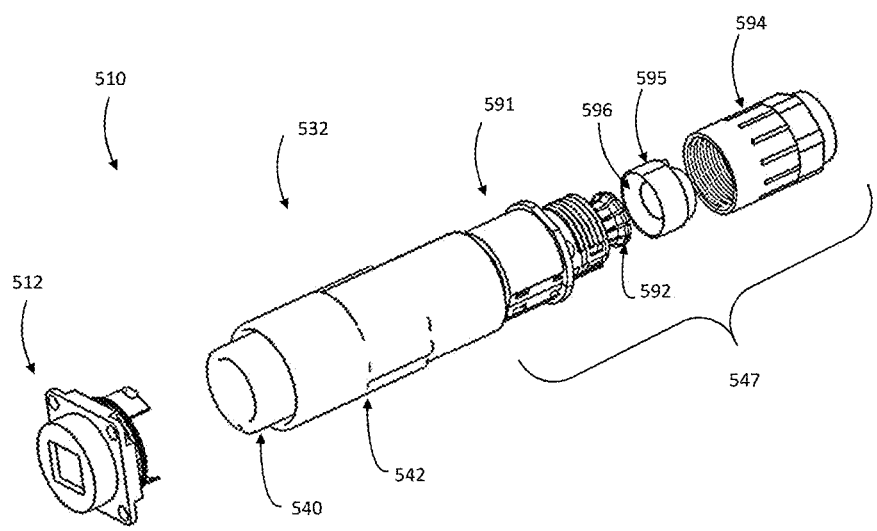
Figure 58:
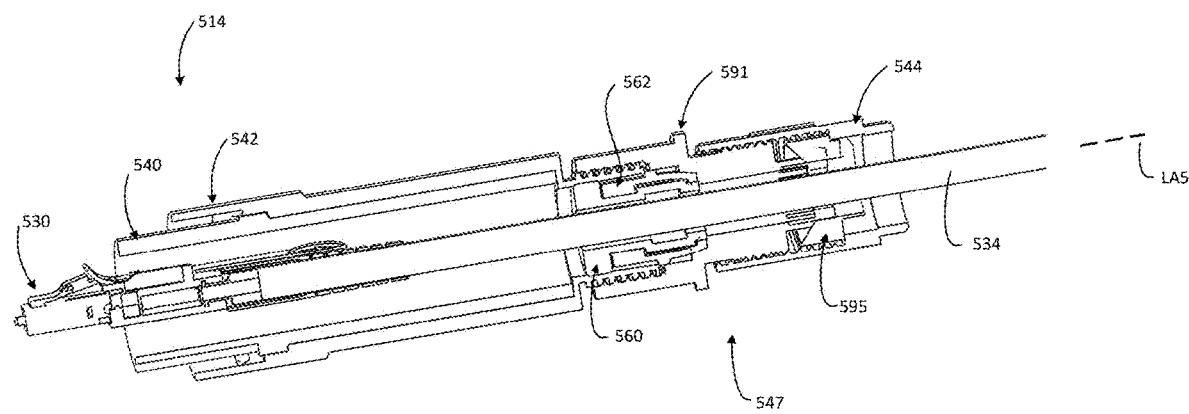
Figure 59:
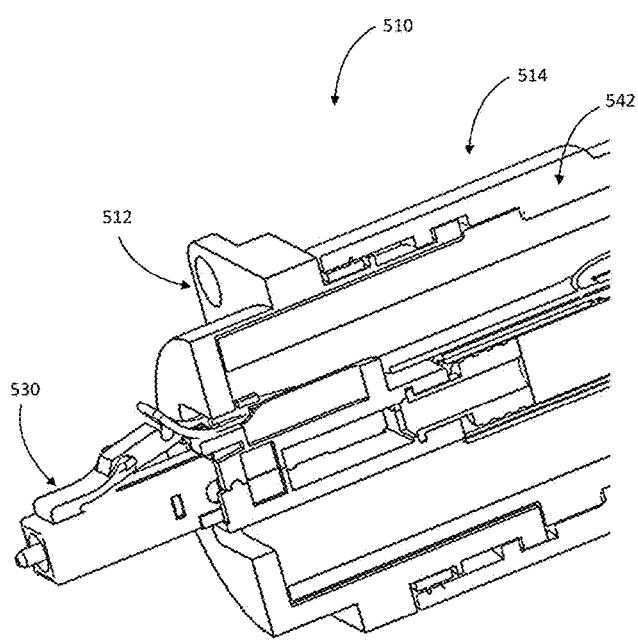
Figure 60:
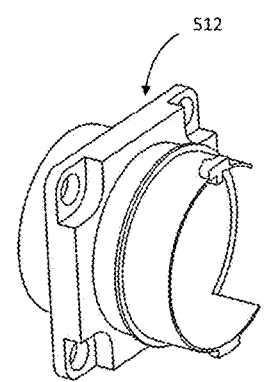
Figure 61:
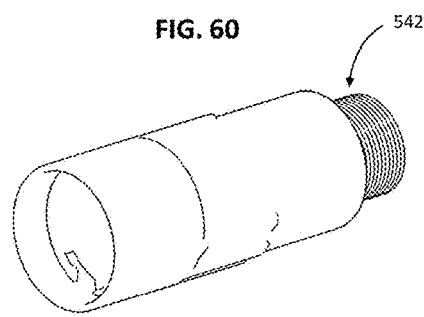

11B is perspective of the system of FIG. 8A shown in longitudinal section;

FIG. 12 is a perspective of the system of FIG. 8A connected to an adapter;

FIG. 13 is a perspective of the bulkhead adapter of the system of FIG. 2A;

FIG. 14 is a perspective of the bulkhead adapter of the system of FIG. 8A;

15 is the perspective of FIG. 12 shown in longitudinal section;

FIG. 16A is a perspective of an alternative optical fiber plug that can be used in any connection system of the present disclosure;

FIG. 16B is a perspective of another alternative optical fiber plug that can be used in any connection system of the present disclosure;

FIG. 17 is a perspective of a third embodiment of an ingress-protected bulkhead connection system in accordance with the present disclosure;

FIG. 18 is an exploded perspective of the system of FIG. 17 with a plug and cable removed;

FIG. 19 is a perspective of the system of FIG. 17 shown in longitudinal section;

FIG. 20 is an elevation of a bulkhead adapter of the system of FIG. 17;

FIG. 21 is a perspective of an ingress-protected connector assembly of the system of FIG. 17;

FIG. 22 is an enlarged fragmentary longitudinal section of the system of FIG. 17;

FIG. 23 is an elevation in of the system of FIG. 17 illustrating a lock ring in a non-locking position and showing other components of the ingress-protected connector assembly in longitudinal section;

FIG. 24 is an elevation similar to FIG. 23, but showing the lock ring at a locking position;

FIG. 25 is an enlarged fragmentary longitudinal section of a region of the ingress-protected connector assembly taken as indicated in FIG. 24;

FIGS. 26A-26F are a series of elevations of the system of FIG. 17 illustrating a sequence of steps of field-installing an ingress-protected connector assembly and operably connecting the ingress-protected connector assembly to a bulkhead adapter;

FIGS. 27A-27C are a series of exploded perspectives of the system of FIG. 17 illustrating a sequence of steps of field-installing the ingress-protected connector assembly;

FIG. 28 is an elevation of the bulkhead adapter of the connection system of FIG. 17, showing exemplary dimensions in mm;

FIG. 29 is an end elevation of the bulkhead adapter, showing exemplary dimensions in mm;

FIG. 30 is a top plan view of the connection system of FIG. 17, showing exemplary dimensions in mm;

FIG. 31 is a perspective of another embodiment of an ingress-protected optical fiber connector assembly;

FIG. 32 is an exploded perspective of the connector assembly of FIG. 31;

FIGS. 33A-33J are a series of elevations depicting a method of assembling the connector assembly of FIG. 31 in the field;

FIGS. 34A-34E are a series of perspectives depicting a method of connecting the connector assembly of FIG. 31 to a bulkhead adapter;

FIGS. 35A-35D are a series of perspective depicting a method of disconnection the connector assembly of FIG. 31 from the bulkhead adapter;

FIG. 36 is a longitudinal section of the connector assembly of FIG. 31;

FIG. 37 is a perspective of an outer housing of the connector assembly of FIG. 31 in longitudinal cross-section;

FIG. 38 is an elevation of an inner housing of the connector assembly of FIG. 31;

FIG. 39 is a perspective of a bulkhead adapter for connecting to the connector assembly of FIG. 31;

FIG. 40 is a longitudinal section of a subassembly of the inner and outer housings of the connector assembly of FIG. 31;

FIG. 41 is an enlarged view of a portion of FIG. 40;

FIG. 42 is a fragmentary perspective of a subassembly of the connector assembly of FIG. 31 including the inner and outer housings and a cable clamp;

FIG. 43 is an enlarged fragmentary illustration of the cable clamp in cross-section;

FIG. 44 is a perspective of a clamp shell member of the cable clamp;

FIG. 45 is an exploded perspective of the cable clamp;

FIG. 46 is a cross section of the cable clamp;

FIG. 47 is a perspective of a subassembly of the connector assembly of FIG. 31 including the cable clamp and an optical fiber plug;

FIG. 47A is another perspective of the subassembly of FIG. 47 showing the cable clamp on the optical fiber cable at a location rearwardly spaced from the optical fiber plug to show a non-circular opening of the cable clamp;

FIG. 47B is a perspective in longitudinal section of the subassembly of FIG. 47 with the clamp installed at the preferred position;

FIG. 48 is a cross section of a subassembly of the connector assembly of FIG. 31 including the inner housing and the outer housing;

FIG. 49 is a cross section similar to FIG. 48 of a subassembly that also includes the cable clamp;

FIG. 50 is another perspective of a clamp shell member;

FIG. 51 is a longitudinal section of a subassembly of the connector assembly of FIG. 31 including the inner housing, the outer housing, a compressible cable seal, and a collet;

FIG. 52 is an enlarged fragmentary longitudinal section of the connector assembly of FIG. 31, illustrating a cable seal assembly thereof;

FIG. 53 is a perspective of the connector assembly of FIG. 31 in a dust cap;

FIG. 54 is a longitudinal section of the connector assembly of FIG. 31 as shown in FIG. 53;

FIG. 55 is a perspective of another embodiment of an ingress-protected bulkhead connection system;

FIG. 56 is an exploded perspective of the connection system of FIG. 55 with a plug and cable removed;

FIG. 57 is another exploded perspective of the connection system of FIG. 55 with the plug and cable removed;

FIG. 58 is perspective in longitudinal section of an ingress-protected optical fiber connector assembly of the connection system of FIG. 55;

FIG. 59 is an enlarged fragmentary perspective in longitudinal section of the connection system of FIG. 55;

FIG. 60 is a perspective of a bulkhead adapter of the connection system of FIG. 55; and FIG. 61 is a perspective of an outer housing of the connector assembly of the connection system of FIG. 55.

Corresponding parts are given corresponding reference characters throughout the drawings.

DETAILED DESCRIPTION

Figure 1:
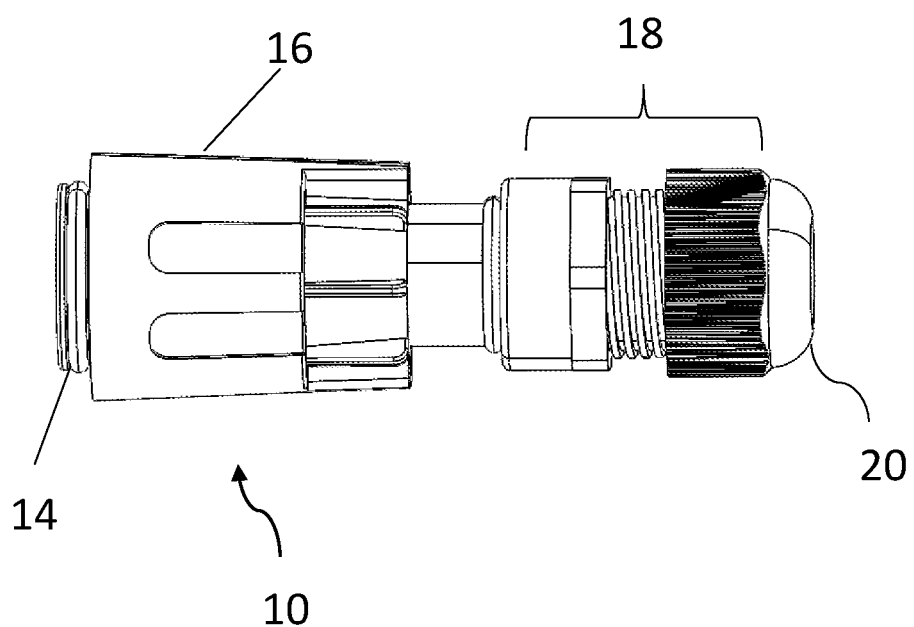
FIG. 1 is a perspective of a prior art ingress-protected bulkhead connector assembly.

Referring to FIG. 1, a prior art bulkhead connector 10 comprises an inner connector housing 12 configured to be inserted forwardly into a bulkhead adapter (not shown), a gasket 14 disposed on the inner connector housing 12 for sealing an interface between the inner connector housing and the bulkhead adapter, a coupling nut 16 disposed on the inner connector housing for rotatably coupling to the bulkhead adapter, and a cable gland assembly 18 comprising a cable gland nut 20 configured to be rotated separately from the coupling nut 16 to seal the bulkhead connector 10 to an optical fiber cable (not shown). The inventors believe that the two rotatable nuts 16, 20 of the prior art bulkhead adapter create duplication of work when making a connection to a bulkhead adapter.

Referring to FIGS. 2A-3B and 6-7, a non-limiting embodiment of an ingress-protected bulkhead connection system (or, more broadly, a rugged connection system) in accordance with the present disclosure is generally indicated at reference number 110. The bulkhead connection system 110 broadly comprises a bulkhead adapter 112 (or, more broadly, a rugged adapter) and an ingress-protected fiber optic connector assembly 114 for being operatively connected to the bulkhead adapter. The bulkhead adapter 112 comprises a flange 120 configured to be secured to a bulkhead (e.g., a fiber optic enclosure wall or panel), an O-ring gasket 122 (broadly, a seal) configured to be compressed between the bulkhead and the flange to make a watertight and debris-tight seal of the interface between the bulkhead adapter and the bulkhead, and a connector interface collar 124 extending from the flange in a longitudinal direction away from the bulkhead. The bulkhead adapter 112 is configured to be positioned on the bulkhead such that a longitudinal passage through the bulkhead adapter aligns with an opening in the bulkhead and an optical receptacle 128 (see FIG. 4C; e.g., an adapter or transceiver) at the opening. As explained more fully below, the bulkhead adapter 112 is configured to mate with the ingress-protected fiber optic connector assembly 114 such that an optical connection is made between the ingress-protected fiber optic connector assembly 114 and the receptacle 128 at the bulkhead opening. In the illustrated embodiment, the connector interface collar 124 is externally threaded for making a threaded connection to the ingress-protected fiber optic connector assembly 114. The connector interface collar 124 also comprises an alignment keyway 126 for ensuring proper alignment of the ingress-protected fiber optic connector assembly 114 to the bulkhead adapter 112 as described in further detail below. The keyway 126 extends only part of the length of the connector interface collar 124 and opens through the interior end of the connector interface collar 124 opposite the flange 120.

The ingress-protected connector assembly 114 broadly comprises an optical fiber plug 130 and an ingress-protected housing assembly 132. The optical fiber plug 130 is configured to terminate an optical fiber cable 134. The cable 134 is preferably factory-terminated, but can also be field-terminated in certain applications. If field-terminated, both mechanically-spliced or fusion-spliced plugs 130 are contemplated within the scope of the disclosure. In the illustrated embodiment, the plug 130 is a duplex LC plug known to those skilled in the art. Hence, in the illustrated embodiment, the receptacle 128 located at the bulkhead adapter 112 may be a duplex LC adapter or duplex LC transceiver interface. In other embodiments, other types of optical fiber plugs (and corresponding receptacles) can be used. For example, the inventors expressly contemplate a CS connector 130' (FIG. 16A) or SN connector 130" (FIG. 16B) being used in place of the duplex LC plug 130.

The ingress-protected housing assembly 132 is broadly configured to couple to the bulkhead adapter 112 to enclose the optical fiber plug 130 and seal the interface between the bulkhead adapter and the cable 134. In the illustrated embodiment, the ingress-protected housing assembly 132 comprises an inner housing 140, an O-ring gasket 141, an outer housing 142, and a cable seal assembly 144 configured to be actuated by the outer housing for sealing an interface between the inner housing 140 and the cable 134, as described in further detail below. As explained below, the entire ingress-protected housing assembly 132 is field-installable onto the plug-terminated cable 134. In view of this disclosure, those skilled in the art will see that the field-installable ingress-protected housing assembly 132 can be useful for making FTTX connections in outdoor or other harsh environments that require a seal of the optical interface.

The ingress-protected connector assembly 114 has a longitudinal axis LA1. The inner housing 140 has a front end portion and a rear end portion spaced apart along the longitudinal axis LA1. Throughout this disclosure, the forward direction of the connector assembly is always toward the connector assembly moves toward a complementary adapter to make a connection and the rearward direction is always in the direction that the cable is to extend out of the connector assembly. The front end portion of the inner housing 140 is configured to be inserted into the bulkhead adapter 112. The front end portion of the inner housing 140 defines an annular groove 150 in which to receive the O-ring gasket 141. The groove 150 positions the gasket 141 such that, when the front end portion of the inner housing 140 is inserted into the bulkhead adapter, the gasket 141 sealingly engages the interior of the connector interface collar 124 at a location forwardly spaced from the end of the keyway 126 along the longitudinal axis LA1. The gasket 141 is thus configured to seal the interface between the front end portion of the inner housing 140 and the bulkhead adapter 112. More broadly, the gasket 141 is configured to seal the interface between the front end portion of the ingress-protected housing assembly 132 and the bulkhead adapter 112.

The inner housing 140 comprises a longitudinal key 152 (broadly, a keying feature) protruding from the exterior of the inner housing adjacent to the front end portion thereof. The key is configured to be slidably received in the keyway 126 (which is broadly a complementary keying feature to the primary keying feature of the key 152) as the inner housing. The key 152 and keyway 126 generally allow for insertion of the front end portion of the inner housing 140 in an aligned circumferential orientation about the longitudinal axis LA1 and block insertion of the inner housing into the bulkhead adapter at other circumferential orientations with respect to the longitudinal axis. The key 152 is spaced apart along the longitudinal axis rearwardly of the groove 150 and O-ring gasket 141.

The inner housing 140 has an interior passage 154 extending longitudinally from the front end portion through the rear end portion thereof. The interior passage 154 is sized and arranged to allow insertion of the optical fiber plug 130 forward along the longitudinal axis LA1 through the passage to field-load the inner housing onto the optical fiber cable 134.

The illustrated cable seal assembly 144 comprises a compressible cable seal 160 (also called a grommet), a collet 162, and a push ring 164. Each of the cable seal assembly components 160, 162, 164 is an annular component having a through passage along the longitudinal axis LA in which the component is configured to receive the optical fiber cable 134. To facilitate field installation of the cable seal assembly 144, each of the components 160, 162, 164 of the cable seal assembly is of a two piece or clamshell construction that can be selectively opened for installation onto the optical fiber cable by radial movement with respect to the longitudinal axis LA1. Each component 160, 162, 164 can have a single longitudinal spit line at which two opposing longitudinal edges of the component are normally biased closed or held together. Such a component is selectively openable by pulling the opposed longitudinal edges apart to widen the opening at the longitudinal split sufficiently to allow passage of the optical fiber cable radially into the interior through passage via the opened longitudinal split. When the cable is placed in the respective through passage, the component is closed so that the opposed longitudinal edges at the split line are biased or held together. Alternatively, instead providing a single longitudinal split line, any of the annular components can also be formed from separate first and second shell pieces, each forming less than 360 degrees of the entire annular component structure, wherein the two shell pieces are selectively attachable to one another on the cable to form an annular component that extends 360 degrees around the cable.

The compressible cable seal 160 and the collet 162 are configured to be coupled together on the cable 134 to limit relative movement between the collet and the cable seal along the longitudinal axis. Each of the cable seal 160 and the collet 162 comprises a front end portion and a rear end portion spaced apart along the longitudinal axis LA1. The front end portion of the compressible cable seal 160 has an outer perimeter that is enlarged in relation to the remainder of the cable seal. The cable seal 160 has an outer annular recess 166 at a location spaced apart between the front end portion and the rear end portion. The collet 162 comprises an inner annular flange 168 at the front end portion, a plurality of radially bendable collet fingers 170 at the rear end portion, and an outer annular flange 172 spaced apart between the front end portion and the rear end portion of the collet. The inner annular flange 168 of the collet 162 is configured to be received in the outer annular recess 166 of the compressible cable seal 160 so that the inner annular flange is prevented from moving along the longitudinal axis LA1 within the recess. In the illustrated embodiment, the collet 162 is formed from first and second shell pieces that come together on the compressible cable seal 160 such that the inner annular flange 168 is received in the outer annular recess 166, thereby forming a two-part subassembly that moves as one unit along the cable 134. The two-part sub-assembly of the compressible cable seal 160 and the collet 162 is configured to be pushed forward as a unit into the rear end portion of the inner housing 140 until the outer annular flange 172 engages the rear end of the inner housing, thus stopping forward movement of the subassembly. The outer perimeter of the enlarged front end portion of the compressible cable seal 160 is configured to sealingly engage the inner perimeter of the inner housing 140, thereby sealing the interface between the cable seal assembly 144 and the inner housing. As explained below, the bendable collet fingers 170 are configured to bend radially inward to sealingly compress the compressible cable seal 160 onto the cable 134, thereby sealing the interface between the cable seal assembly 144 and the cable. The The push ring 164 comprises a front end portion and a rear end portion spaced apart along the longitudinal axis LA1. The front end portion defines an inner annular chamfer 176. The push ring 164 is configured to be advanced forward along the cable 134, whereby the inner chamfer 176 of the push ring bears against the rear end of the collet fingers 170 to deflect the collet fingers radially inward and thereby compress the compressible cable seal 160 against the cable 134 to seal the interface between the cable seal assembly 144 and the cable 134.

The outer housing 142 comprises an annular wall extending along the longitudinal axis from a front end portion to a rear end portion. The outer housing 142 has an interior passage 178 extending longitudinally from the front end portion through the rear end portion thereof. The interior passage 178 is sized and arranged to allow insertion of the optical fiber plug 130 forward along the longitudinal axis LA1 through the passage to field-load the outer housing 142 onto the optical fiber cable 134. The front end portion of the outer housing 142 is internally threaded for threadably coupling to the connector interface collar 124. The rear end portion of the outer housing 142 defines an internal annular shoulder 180 that is configured to engage the push ring 164 and advance the push ring forward along the longitudinal axis LA1 as the outer housing is threaded onto the connector interface collar 124.

Figure 4A:
FIGS. 4A-4E are a series of elevations of the system of FIG. 2A illustrating a sequence of steps of field-installing an ingress-protected connector assembly and operably connecting the ingress-protected connector assembly to a bulkhead adapter.
Figure 4B:
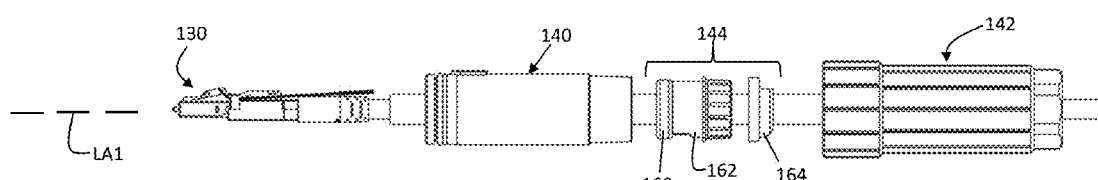
Figure 4C:
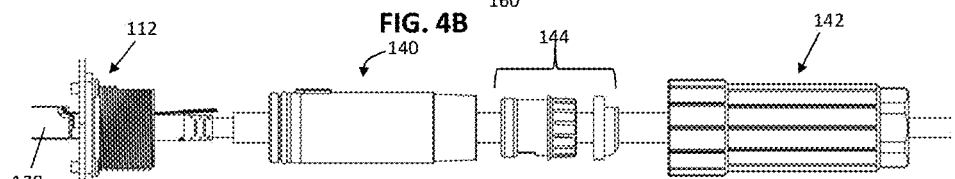
Figure 4D:
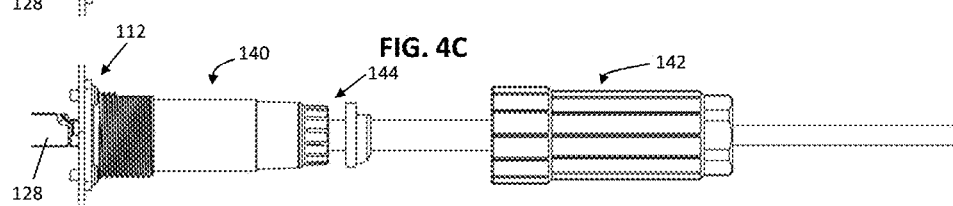
Figure 4E:
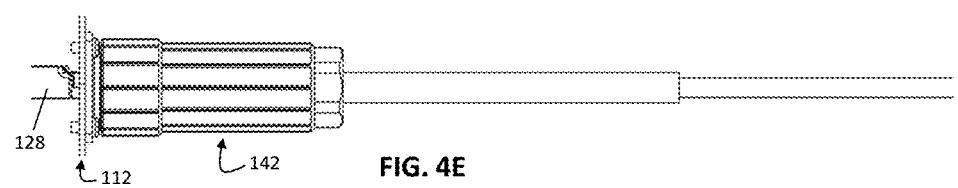
Figures 6A, 6B, 7:
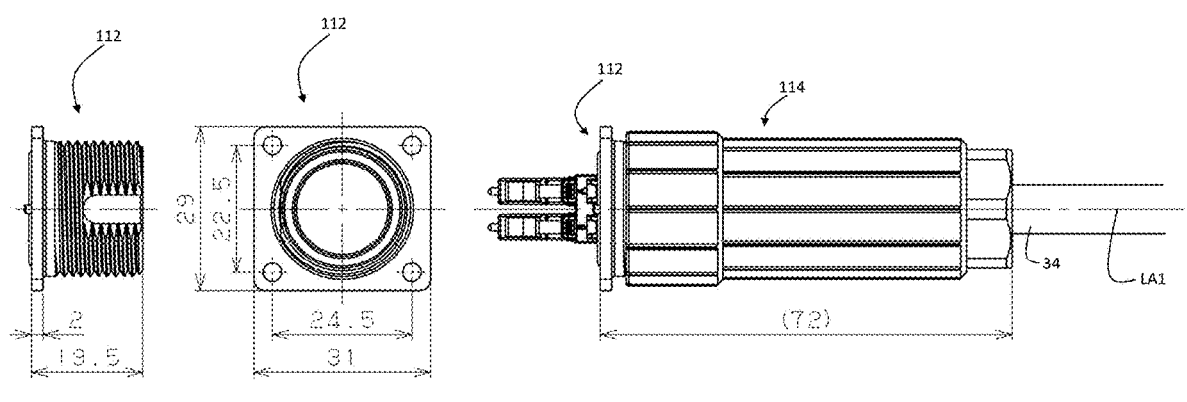
FIG. 6A is a top plan view of the bulkhead adapter of the connection system of FIG. 2A, showing exemplary dimensions in mm.
FIG. 6B is an end elevation of the bulkhead adapter, showing exemplary dimensions in mm.
FIG. 7 is a top plan view of the connection system of FIG. 2A, showing exemplary dimensions in mm.

Referring to FIGS. 4A-4E and 5A-C, an exemplary method of deploying the ingress-protected bulkhead connection system 110 will now be briefly described. At the start of the method, the bulkhead adapter 112 is operatively installed at a bulkhead and an optical fiber cable 134 terminated by a plug 130 for mating with the receptacle 128 is provided (FIG. 4A). Initially, the ingress-protected fiber optic connector assembly 114 is loaded onto the cable 134. Referring to FIGS. 5A-5C the user inserts the plug 130 forwardly through the passage 178 of the outer housing 142, loads the cable 134 radially into the cable seal 160 and the push ring 164, installs the collet 162 on the cable seal 160, and inserts the plug 130 forwardly through the passage 154 of the inner housing 140. Subsequently, referring to FIGS. 4B and 4C, the plug 130 is mated with a receptacle 128 at the bulkhead adapter 112. Next, as shown in FIG. 4D, the user inserts the front end portion of the inner housing 140 into the bulkhead adapter 112 oriented so that the key 152 is received in the keyway. As explained above, this engages the O-ring 141 with the bulkhead adapter 112 to seal the interface between the inner housing 140 and the bulkhead adapter. The user also advances the two-part cable seal subassembly, made up of the compressible cable seal 160 and the collet 162, forward into the inner housing 140 until the outer annular flange 172 engages the rear end of the inner housing. This seals the interface between the cable seal assembly 164 and the inner housing 140 as explained above. The user positions the push ring 164 at the rear end of the collet 162 and advances the outer housing 142 forward along the cable until contact is made with the connector interface collar 124.

Up to and including this point in the process, the outer housing 142 is in an uncoupled position—e.g., a position at which the outer housing is not fastened in place in relation to the bulkhead adapter 112. To advance the outer housing 142 from the uncoupled position to the coupled position shown in FIG. 4E, as well as FIGS. 2A and 3A-3b, the user rotates the outer housing 142 in a coupling direction (e.g., clockwise) about the longitudinal axis LA1 to threadably couple the outer housing to the connector interface collar 124. Rotating the outer housing 142 to advance the outer housing to the coupling position simultaneously (1) compresses the compressible cable seal 160 against the optical fiber cable 134 to make a fluid seal between the ingress-protected housing assembly 132 and the optical fiber cable and (2) fastens the ingress-protected housing assembly 132 to the bulkhead adapter 112 so that the rotatable outer housing 142 must be counter-rotated in an uncoupling direction (e.g., counter-clockwise) about the longitudinal axis to separate the ingress-protected housing assembly from the bulkhead adapter 112. Thus, whereas prior art bulkhead connection systems of the type depicted in FIG. 1 require two rotating parts for the functions (1) and (2), the illustrated ingress-protected bulkhead connection system 110 achieves both functions by rotating a single connector housing component 142. As the outer housing 142 rotates in the coupling direction to advance to the coupling position, the outer housing advances the push ring 164 forward along the longitudinal axis LA1 and deflects the collet fingers 170 radially inward with respect to the longitudinal axis to compress the compressible cable seal against the cable 134.

Referring to FIGS. 8-12 and 14-15, another embodiment of an ingress-protected bulkhead connection system in accordance with the present disclosure is generally indicated at reference number 210. The bulkhead connection system 210 is similar to the bulkhead connection system 110, and corresponding parts are given the same reference number, plus 100. The connection system 210 broadly comprises a bulkhead adapter 212 and an ingress-protected fiber optic connector assembly 214 for being operatively connected to the bulkhead adapter. As with the bulkhead connection system 110, the bulkhead connection system 210 is configured to use only a single rotating part to simultaneously (1) fasten the bulkhead connector assembly 214 to the bulkhead adapter 212 and seal the optical interface.

The bulkhead adapter 212 comprises a flange 220 configured to be secured to a bulkhead (e.g., a fiber optic enclosure wall or panel), an O-ring gasket 222 (broadly, a seal) configured to be compressed between the bulkhead and the flange to make a watertight and debris-tight seal of the interface between the bulkhead adapter and the bulkhead, and a connector interface collar 224 extending from the flange in a longitudinal direction away from the bulkhead. The bulkhead adapter 212 is configured to be positioned on the bulkhead such that a longitudinal passage through the bulkhead adapter aligns with an opening in the bulkhead and an optical receptacle 228 at the opening. In the illustrated embodiment, the connector interface collar 224 is non-threaded, but includes a pair of resiliently bendable detent arms 225, each possessing a detent opening 227. The detent arms 224 and detent openings 227 may broadly be referred to as complementary detent formations for making a detent connection to corresponding detent formations of the optical connector assembly 214, described below. The connector interface collar 224 also comprises two alignment keyway slots 226 on opposite sides of each detent arm 225 for ensuring proper alignment of the ingress-protected fiber optic connector assembly 214 to the bulkhead adapter 212 as described in further detail below. Each keyway slot 226 extends only part of the length of the connector interface collar 224 and opens through the tip of the connector interface collar 224.

The ingress-protected connector assembly 214 broadly comprises an optical fiber plug 230 and an ingress-protected housing assembly 232. The optical fiber plug 230 can have any of the features of the optical fiber plug 130 described above. The ingress-protected housing assembly 232 is broadly configured to couple to the bulkhead adapter 212 to enclose the optical fiber plug 232 and seal the interface between the bulkhead adapter and the cable 234. In the illustrated embodiment, the ingress-protected housing assembly 232 comprises an inner housing 240 (see FIGS. 8A and 8B), an O-ring gasket 241, an outer housing 242 (see FIGS. 11A-11B), and a cable seal assembly 244. As above, the entire ingress-protected housing assembly 232 is field-installable onto the plug-terminated cable 234.

The ingress-protected connector assembly 214 has a longitudinal axis LA2. The inner housing 240 has a front end portion and a rear end portion spaced apart along the longitudinal axis LA2. The front end portion of the inner housing 240 is configured to be inserted into the bulkhead adapter 212. The front end portion of the inner housing 240 defines an annular groove 250 in which to receive the O-ring gasket 241. The groove 250 positions the gasket 241 such that, when the front end portion of the inner housing 240 is inserted into the bulkhead adapter, the gasket 241 sealingly engages the interior of the connector interface collar 224 at a location forwardly spaced from the end of the keyway slots 226 along the longitudinal axis LA2. The gasket 241 is thus configured to seal the interface between the front end portion of the inner housing 240 and the bulkhead adapter 212. More broadly, the gasket 241 is configured to seal the interface between the front end portion of the ingress-protected housing assembly 232 and the bulkhead adapter 212.

The inner housing 240 comprises (top and bottom) longitudinal keys 252 (each, broadly, a keying feature) protruding from the exterior of the inner housing adjacent to the front end portion thereof. Each key is configured to be slidably received in a corresponding keyway slots 226 (which is broadly a complementary keying feature to the primary keying feature of the key 252). The keys 252 and keyway slots 226 generally allow for insertion of the front end portion of the inner housing 240 in an aligned circumferential orientation about the longitudinal axis LA2 and block insertion of the inner housing into the bulkhead adapter at other circumferential orientations with respect to the longitudinal axis. The front ends of the keys 252 are spaced apart along the longitudinal axis rearwardly of the groove 250 and O-ring gasket 241.

The inner housing 240 also comprises a pair of detent protrusions 255 protruding radially outwardly at diametrically opposite locations. Each detent is located circumferentially midway between two longitudinal keys 252. The detent protrusion 255 is broadly a detent formation configured to engage a complementary detent formation 225, 227 of the bulkhead adapter 212 to temporarily hold the inner housing at an operative position in relation to the bulkhead adapter. In particular, when the front end portion of the inner housing 240 is inserted into the bulkhead adapter 212, the detent protrusions will deflect the detent arms 225 radially outward until the detent protrusions snap into the detent openings 227. This makes a temporary detent connection between the inner housing 240 and the bulkhead adapter. Prior to coupling of the outer housing 242, the detent connection is releasable such that the inner housing 240 can be bulled rearwardly for extraction from the bulkhead adapter. The detent connection provides a small resistance to withdrawal of the inner housing 240 but the detent arms 225 will yield, deflecting radially outward until the detent protrusions clear the top of the interface collar 224.

In the illustrated embodiment, the rear end portion of the inner housing 240 is externally threaded for threadably coupling to the outer housing 242, as described in further detail below. The illustrated ingress-protected bulkhead connection system 210 uses the detent connection of the inner housing 240 to the bulkhead adapter 212 in combination with the threaded connection of the inner housing to the outer housing to fasten the ingress-protected connector assembly 214 to the bulkhead adapter.

Like the inner housing 140 above, the inner housing 240 has an interior passage 254 extending longitudinally from the front end portion through the rear end portion thereof. The interior passage 254 is sized and arranged to allow insertion of the optical fiber plug 230 forward along the longitudinal axis LA2 through the passage to field-load the inner housing onto the optical fiber cable 234.

The illustrated cable seal assembly 244 is substantially identical to the cable seal assembly 144 described above. Like the cable seal 144 described above, the cable seal 244 comprises a compressible cable seal 260 (also called a grommet) configured to sealingly engage the inner perimeter of the inner housing, a collet 262 configured to be installed on the cable seal 260, and a push ring 264 for being advanced forward by the outer housing to radially deflect the rear end portion of the collet 262 and thereby compress the compressible cable seal against the cable 234 to seal the interface between the cable seal assembly 244 and the cable. For a discussion of the specific features of the components 260, 262, 264, refer to the discussion of the corresponding components 160, 162, 164 above.

The outer housing 242 comprises an annular wall extending along the longitudinal axis from a front end portion to a rear end portion. The outer housing 242 has an interior passage 278 extending longitudinally from the front end portion through the rear end portion thereof. The interior passage 278 is sized and arranged to allow insertion of the optical fiber plug 230 forward along the longitudinal axis LA2 through the passage to field-load the outer housing 242 onto the optical fiber cable 234. In the illustrated embodiment, the front end portion of the outer housing 242 defines an unthreaded shroud configured to matingly receive the connector interface collar 224 therein when the outer housing is in the coupling position, without directly threading onto the connector interface collar 224. When the inner housing 240 is inserted into the bulkhead adapter 212 and the outer housing matingly receives the connector interface collar 224, the front end portion of the outer housing prevents release of the detent protrusions 255 from the detent openings 227 by blocking the detent arms 225 from deflecting radially outward. In this way, the outer housing 242 secures the connection between the ingress-protected connector assembly 214 and the bulkhead adapter 212 without directly making a threaded or bayonet connection at the interface collar 224. The rear end portion of the outer housing 242 defines an internal annular shoulder 280 that is configured to engage the push ring 264 and advance the push ring forward along the longitudinal axis LA2 as the outer housing is threaded onto the connector interface collar 224. In addition, the rear end portion of the outer housing 242 in front of the shoulder 280 is internally threaded for threadably coupling to the threaded rear end portion of the inner housing 240.

An exemplary method of deploying the ingress-protected bulkhead connection system 210 will now be briefly described. At the start of the method, the bulkhead adapter 212 is operatively installed at a bulkhead and an optical fiber cable 234 terminated by a plug 230 for mating with the receptacle 228 is provided. Initially, the ingress-protected fiber optic connector assembly 214 is loaded onto the cable 234. The user inserts the plug 230 forwardly through the passage 278 of the outer housing 242, loads the cable 234 radially into the cable seal 260 and the push ring 264, installs the collet 262 on the cable seal 260, and inserts the plug 230 forwardly through the passage 254 of the inner housing 240. Subsequently, the plug 230 is mated with a receptacle 228 at the bulkhead adapter 212. Next, the user inserts the front end portion of the inner housing 240 into the bulkhead adapter 212 oriented so that the keys 252 are received in the keyways 226. As explained above, this engages the O-ring 241 with the bulkhead adapter 212 to seal the interface between the inner housing 240 and the bulkhead adapter. This also makes a temporary detent connection between the inner housing 240 and the bulkhead adapter 212. The user advances the two-part cable seal subassembly, made up of the compressible cable seal 260 and the collet 262, forward into the inner housing 240 until the collet engages the rear end of the inner housing. This seals the interface between the cable seal assembly 264 and the inner housing 240 as explained above. The user then positions the push ring 264 at the rear end of the collet 262 and advances the outer housing 242 forward along into contact with the inner housing 240.

Up to and including this point in the process, the outer housing 242 is in an uncoupled position—e.g., a position at which the outer housing is not fastened in place in relation to the bulkhead adapter 212. To advance the outer housing 242 from the uncoupled position to the coupled position shown in FIG. 11B, for example, the user rotates the outer housing 242 in a coupling direction (e.g., clockwise) about the longitudinal axis LA2 to threadably couple the outer housing to the inner housing 240. Rotating the outer housing 242 to advance the outer housing to the coupling position simultaneously (1) compresses the compressible cable seal 260 against the optical fiber cable 234 to make a fluid seal between the ingress-protected housing assembly 232 and the optical fiber cable and (2) fastens the ingress-protected housing assembly 232 to the bulkhead adapter 212 so that the rotatable outer housing 242 must be counter-rotated in an uncoupling direction (e.g., counter-clockwise) about the longitudinal axis to separate the ingress-protected housing assembly from the bulkhead adapter 212. The sealing of (1) is made in the same way as described above in reference to the ingress-protected connection system 110. The fastening of (2) is made in different way. Moving the outer housing into the coupling position positions the front end portion of the outer housing 242 over the detent arms 225 such that they cannot deflect outward to release the detent protrusions 255 from the detent openings 227.

Referring to FIGS. 17-30, another embodiment of an ingress-protected bulkhead connection system in accordance with the present disclosure is generally indicated at reference number 310. The bulkhead connection system 310 is similar to the bulkhead connection system 110, and corresponding parts are given the same reference number, plus 100. The connection system 310 broadly comprises a bulkhead adapter 312 and an ingress-protected fiber optic connector assembly 314 for being operatively connected to the bulkhead adapter. As with the bulkhead connection system 110, the bulkhead connection system 310 is configured to use only a single rotating part to simultaneously (1) fasten the bulkhead connector assembly 314 to the bulkhead adapter 312 and seal the optical interface.

The bulkhead adapter 312 comprises a flange 320 configured to be secured to a bulkhead (e.g., a fiber optic enclosure wall or panel), an O-ring gasket 322 (broadly, a seal) configured to be compressed between the bulkhead and the flange to make a watertight and debris-tight seal of the interface between the bulkhead adapter and the bulkhead, and a connector interface collar 324 extending from the flange in a longitudinal direction away from the bulkhead. The bulkhead adapter 312 is configured to be positioned on the bulkhead such that a longitudinal passage through the bulkhead adapter aligns with an opening in the bulkhead and an optical receptacle 328 at the opening.

Referring to FIG. 20, the connector interface collar 324 comprises a bayonet slot 323. More particularly, the illustrated connector interface collar 324 comprises three bayonet slots 323. Each slot 323 comprises a groove formed in the outer perimeter of the connector interface collar 324. Each bayonet slot has a starting end that opens through the tip of the connector interface collar 324 and extends along the a generally helical path in a clockwise direction toward the flange 320, to a closed terminal end of the slot. Along the length of each bayonet slot 323 are three spaced apart locking detents 323A, 323B, 323C. Each locking detent 323A, 323B, 323C comprises a ramp-shaped protrusion 333 extending radially outward in the slot and a landing recess 329 immediately beyond the ramp-shaped protrusion 333 on the edge of the slot located further from the flange 320 along the axis of the connector interface collar 324.

As shown in FIG. 28, the connector interface collar 324 also comprises a keyway slot 326 for ensuring proper alignment of the ingress-protected fiber optic connector assembly 314 to the bulkhead adapter 312 as described in further detail below. Additionally, the illustrated connector collar interface 324 comprises a plurality of spaced apart lock ring recesses 331, the use of which will be described in further detail below.

Referring to FIGS. 17 and 18, the ingress-protected connector assembly 314 broadly comprises an optical fiber plug 330 and an ingress-protected housing assembly 332.

The optical fiber plug 330 can have any of the features of the optical fiber plug 130 described above. The ingress-protected housing assembly 332 is broadly configured to couple to the bulkhead adapter 312 to enclose the optical fiber plug 332 and seal the interface between the bulkhead adapter and the cable 334. In the illustrated embodiment, the ingress-protected housing assembly 332 comprises an inner housing 340, an O-ring gasket 341, an outer housing 342, a cable seal assembly 344, and a lock ring 345, the features of which will be described in further detail below. As above, the entire ingress-protected housing assembly 332 is field-installable onto the plug-terminated cable 334.

The ingress-protected connector assembly 314 has a longitudinal axis LA2. The inner housing 340 has a front end portion and a rear end portion spaced apart along the longitudinal axis LA2. The front end portion of the inner housing 340 is configured to be inserted into the bulkhead adapter 312. The front end portion of the inner housing 340 defines an annular groove 350 in which to receive the O-ring gasket 341. The groove 350 positions the gasket 341 such that, when the front end portion of the inner housing 340 is inserted into the bulkhead adapter, the gasket 341 sealingly engages the interior of the connector interface collar 324 at a location forwardly spaced from the end of the keyway slot 326 along the longitudinal axis LA3. The gasket 341 is thus configured to seal the interface between the front end portion of the inner housing 340 and the bulkhead adapter 312. More broadly, the gasket 341 is configured to seal the interface between the front end portion of the ingress-protected housing assembly 332 and the bulkhead adapter 312.

The inner housing 340 comprises a longitudinal key 352 (broadly, a keying feature) protruding from the exterior of the inner housing adjacent to the front end portion thereof. The key 352 is configured to be slidably received in the keyway 326 (which is broadly a complementary keying feature to the primary keying feature of the key 352). The key 352 and keyway 326 generally allow for insertion of the front end portion of the inner housing 340 in an aligned circumferential orientation about the longitudinal axis LA3 and block insertion of the inner housing into the bulkhead adapter 312 at other circumferential orientations with respect to the longitudinal axis. The front ends of the keys 352 are spaced apart along the longitudinal axis rearwardly of the groove 350 and O-ring gasket 341.

Like the inner housing 140 above, the inner housing 340 has an interior passage 354 extending longitudinally from the front end portion through the rear end portion thereof. The interior passage 354 is sized and arranged to allow insertion of the optical fiber plug 330 forward along the longitudinal axis LA2 through the passage to field-load the inner housing onto the optical fiber cable 334.

The illustrated cable seal assembly 344 is substantially identical to the cable seal assembly 144 described above. Like the cable seal 144 described above, the cable seal 344 comprises a compressible cable seal 360 (also called a grommet) configured to sealingly engage the inner perimeter of the inner housing 340, a collet 362 configured to be installed on the cable seal 360, and a push ring 364 for being advanced forward by the outer housing 342 to radially deflect the rear end portion of the collet 362 and thereby compress the compressible cable seal against the cable 334 to seal the interface between the cable seal assembly 344 and the cable. For a discussion of the specific features of the components 360, 362, 364, refer to the discussion of the corresponding components 160, 162, 164 above.

The outer housing 342 comprises an annular wall extending along the longitudinal axis from a front end portion to a rear end portion. The outer housing 342 has an interior passage 378 extending longitudinally from the front end portion through the rear end portion thereof. The interior passage 378 is sized and arranged to allow insertion of the optical fiber plug 330 forward along the longitudinal axis LA3 through the passage to field-load the outer housing 342 onto the optical fiber cable 334. The rear end portion of the outer housing defines an internal annular shoulder 380 that is configured to engage and forwardly advance the push ring 364 to deflect the collet 362 radially inward and thereby compress the compressible cable seal 360 onto the cable 334 to make a seal with the cable in the manner described above.

In the illustrated embodiment, the front end portion of the outer housing 342 includes three internal spaced apart bayonet pins 355 configured to be received in the bayonet slots 323 for making a bayonet connection to the bulkhead adapter 312. When the inner housing 340 is inserted into the bulkhead adapter 312 and the front end portion of the outer housing 342 is mated with the connector interface collar 324, the three bayonet pins 355 are slidably received in the bayonet slots 323 and begin to slide clockwise along the helical path. This draws the outer housing 342 forward along the longitudinal axis LA3, advancing the push ring 364 and compressing the cable seal 360 accordingly. Each of the plurality of locking detents 323A, 323B, 323C (refer to FIG. 20) defines a respective coupling position at which the outer housing 342 can be locked in position. At each detent 323A, 323B, 323C the bayonet pins must first snap across the ramp protrusions 333. The ramp protrusions provide a degree of resistance to counter rotation of the outer housing 342 in the uncoupling (e.g., counter-clockwise) direction. When the outer housing 342 is at the desired position (e.g., the bayonet pins 355 are at the desired detent 323A, 323B, 323C), the bayonet pins 355 settle in the landing recesses 329 of the corresponding locking detent. It can be seen that the detents 323A, 323B, 323C are spaced apart along the longitudinal axis LA3. Hence, the outer housing 342 will have a different position along the longitudinal axis LA2 at each of the plurality of locking positions. At each of the longitudinally spaced apart positions at which the outer housing 342 can be coupled to the bulkhead adapter 312, the push ring 364 is advanced to a different position; thus the degree of the deflection of the collet 362 is different; and therefore the degree of compression of the cable seal 360 differs. The inventors contemplate that the three spaced apart coupling positions of the outer housing 342 can enable the ingress-protected connector assembly 314 to make a seal to any of a plurality of differently sized cables. In other words, the illustrated bayonet connector interface collar 234 is configured so that a user can selectively couple the outer housing 342 to the bulkhead adapter 312 at any of a plurality of longitudinally spaced apart coupling positions, each corresponding to a different amount of compression of the compressible cable seal 360, such that the user can selectively set the desired amount of cable seal compressible by selectively making a bayonet connection of the outer housing to the bulkhead adapter at the corresponding coupling position.

Referring to FIGS. 18 and 23-25, the outer housing 342 comprises features that interface with the lock ring 345 and enable the lock ring to lock the outer housing at each of the three spaced apart coupling positions corresponding to the locations of the bayonet locking detents 323A, 3223B, 323C. In the illustrated embodiment, the outer housing comprises a plurality of longitudinal lock arm channels 390 and one or more longitudinal detent channels 392, each comprising one or more detent protrusions 394. The lock ring 345 comprises an annular component slidably received on the outer housing 342 for movement with respect to the outer housing along the longitudinal axis LA3. The lock ring 345 comprises a plurality of lock arms 395 slidably received in the lock arm channels 390 and a bendable detent latch 396 slidably received in the detent channel 292. When the outer housing 342 is being rotated, the lock ring 345 must be retracted rearward. Once a bayonet connection is made between the outer housing 342 and the bulkhead adapter 312 at any of the spaced apart coupling positions defined by the detents 323A, 323B, 323C, the lock ring 345 can be advanced forward along the outer housing 342. The free end portions of the lock arms 395 will be received in the lock ring recesses 331 of the connector interface collar 324, and the bendable detent latch 396 will snap across one or more detent protrusions 394. In this position, the lock ring recesses 331 hold the lock ring 345 against rotation about the longitudinal axis LA3. The lock ring 345 in turn holds the outer housing 342 against rotation about the longitudinal axis LA3. To release the outer housing 342 for counter rotation about the longitudinal axis LA3 (e.g., to uncouple the ingress-protected connector assembly 314 from the bulkhead adapter 312), the lock ring must be withdrawn rearward with enough force to overcome the detent connection made by the detent latches 396 and the detent protrusions 394. With the lock ring 345 withdrawn, the outer housing 342 can be counter rotated by imparting enough torque on the outer housing to overcome the detent of the ramp protrusion 333.

Referring to FIGS. 26A-26F and 27A-27C, an exemplary method of deploying the ingress-protected bulkhead connection system 310 will now be briefly described. At the start of the method, the bulkhead adapter 312 is operatively installed at a bulkhead and an optical fiber cable 334 terminated by a plug 330 for mating with the receptacle 328 is provided (FIG. 26A). Initially, the ingress-protected fiber optic connector assembly 314 is loaded onto the cable 334. Referring to FIGS. 26B and 27A-27C the user inserts the plug 330 forwardly through the passage 378 of the outer housing 342, loads the cable 334 radially into the cable seal 360 and the push ring 364, installs the collet 362 on the cable seal 360, and inserts the plug 330 forwardly through the passage 354 of the inner housing 340. Subsequently, referring to FIG. 26C, the plug 330 is mated with a receptacle 328 at the bulkhead adapter 312. Next, as shown in FIG. 26D, the user inserts the front end portion of the inner housing 340 into the bulkhead adapter 312 oriented so that the key 352 is received in the keyway. As explained above, this engages the O-ring 341 with the bulkhead adapter 312 to seal the interface between the inner housing 340 and the bulkhead adapter. The user also advances the two-part cable seal subassembly, made up of the compressible cable seal 360 and the collet 362, forward into the inner housing 340 until the outer annular flange 372 engages the rear end of the inner housing. This seals the interface between the cable seal assembly 364 and the inner housing 340 as explained above. The user positions the push ring 364 at the rear end of the collet 362 and advances the outer housing 342 forward along the cable until contact is made with the connector interface collar 324.

Up to and including this point in the process, the outer housing 342 is in an uncoupled position—e.g., a position at which the outer housing is not fastened in place in relation to the bulkhead adapter 312. Referring to FIG. 26E, to advance the outer housing 342 from the uncoupled position to any of the coupling positions corresponding with the detents 323A, 323B, 323C, the user inserts the bayonet pins 355 into the bayonet slots 323 and rotates the outer housing 342 in a coupling direction (e.g., clockwise) about the longitudinal axis LA1 in order to make a bayonet connection at the desired one of the detent positions. Rotating the outer housing 342 to advance the outer housing to the coupling position simultaneously (1) compresses the compressible cable seal 360 against the optical fiber cable 334 to make a fluid seal between the ingress-protected housing assembly 332 and the optical fiber cable and (2) fastens the ingress-protected housing assembly 332 to the bulkhead adapter 312 so that the rotatable outer housing 342 must be counter-rotated in an uncoupling direction (e.g., counter-clockwise) about the longitudinal axis to separate the ingress-protected housing assembly from the bulkhead adapter 312. The user selects the detent position with the desired amount of compression of the cable seal 360, and then as shown in FIG. 26F, advances the lock ring 345 to provide an additional lock of the outer housing 342 against counter rotation.

Referring to FIGS. 31-54, another embodiment of an ingress-protected bulkhead connection system in accordance with the present disclosure is generally indicated at reference number 410. Here, the ingress-protected bulkhead connection system 410 can also be referred to as a rugged bulkhead connection system. Although the ingress-protected bulkhead connection system 410 is fully ingress-protected, it is not strictly necessary for the system to be ingress-protected in every embodiment. The term "rugged" is used herein broadly to encompass both ingress-protected connection systems and components and also non-ingress-protected systems and components that require more rugged capabilities than standard indoor optical connection equipment. Typically, rugged connection systems and components in the scope of this disclosure are configured for withstand relatively high loads imparted on the cable, such as relatively high tensile loads or torque loads. As explained more fully below, the illustrated bulkhead connection system 410 is equipped with certain features to improve the ability withstand these types of cable loads.

The bulkhead connection system 410 broadly comprises a bulkhead adapter 412 (FIG. 39) and an ingress-protected fiber optic connector assembly 414 (broadly, a rugged optical connector assembly) for being operatively connected to the bulkhead adapter. The illustrated bulkhead adapter 412 is generally configured to be positioned on the bulkhead such that a longitudinal passage through the bulkhead adapter aligns with an opening in the bulkhead and an optical receptacle 428 (see FIG. 34C; e.g., an adapter or transceiver) at the opening. As explained more fully below, the bulkhead adapter 412 is configured to couple with the ingress-protected fiber optic connector assembly 414 via a bayonet connection. Other ways coupling a bulkhead adapter and a connector assembly can also be used without departing from the scope of the disclosure. The bulkhead adapter comprises an internal alignment key 426 as shown in FIG. 39. In the illustrated embodiment, the bulkhead adapter 412 holds an O-ring gasket 429 for sealing the interface between the adapter and the connector assembly 414.

The ingress-protected connector assembly 414 broadly comprises an optical fiber plug 430 and an ingress-protected housing assembly 432 (broadly, a rugged connector housing assembly). The optical fiber plug 430 is configured to terminate an optical fiber cable 434. The optical fiber plug 430 can have any of the features of the optical fiber plug 130 described above. The ingress-protected housing assembly 432 is broadly configured to couple to the bulkhead adapter 412 to enclose the optical fiber plug 432 and seal the interface between the bulkhead adapter and the cable 434. In the illustrated embodiment, the ingress-protected housing assembly 432 comprises an inner housing 440, an outer housing 442, a cable seal assembly 444, and a cable clamp 447, the features of which will be described in further detail below. As above, the entire ingress-protected housing assembly 432 is field-installable onto the plug-terminated cable 434.

Referring to FIGS. 42-50, the cable clamp 447 has a generally annular wall structure extending along a longitudinal axis LA4 of the connector assembly 432 from a front end portion to a rear end portion. The front end portion of the cable clamp 447 is configured receive a rear end portion of the optical fiber plug 430 therein, and the rear end portion of the cable clamp 447 is configured to clamp onto the jacket of the cable 434. The cable clamp 447 comprises first and second clamp shell pieces 447A, 447B configured to coupled together for clamping onto the optical fiber cable 434. When coupled together, the first and second clamp shell pieces 447A, 447B form an annular shape around the optical fiber cable 434 and tightly grip the cable jacket. The cable clamp 447 thus inhibits movement of the optical fiber cable 434 in relation to the cable clamp. In the illustrated embodiment, the clamshell pieces 447A, 447B comprise integral latching features and/or interference fit features for securing the shell pieces in coupled relationship with one other (see, e.g., FIG. 46). However, it will be understood that the clamshell pieces can be coupled together in any suitable way without departing from the scope of the disclosure.

The first and second clamp shell pieces 447A, 447B are configured to be coupled together for clamping onto any of any of a plurality of different optical cables within a cable size range. In an exemplary embodiment, this cable size range extends from at least a minimum cable outer diameter of 4.8 mm to at least a maximum cable diameter of 6.0 mm. To facilitate this interoperability with such a wide range of cable sizes the illustrated cable clamp 447 comprises cable gripping features that can accommodate varying amounts of jacket deformation. In the illustrated embodiment, the cable clamp 447 comprises first and second sets of gripping teeth 481, 482 near the rear end portion at spaced apart locations along the longitudinal axis LA4. The first set of cable gripping teeth 481 is located at a first location along the longitudinal axis LA4 and a second set of cable gripping teeth 482 at a second location along the longitudinal axis spaced apart from the first location. When the cable clamp 447 is clamped onto a cable 434, the gripping teeth 481, 482 bite into the cable jacket and deform the cable jacket and create tight, partially interlocked clamping engagement. It will be seen that the amount of deformation of the jacket during clamping will vary with the type of cable used. To accommodate varying amounts of jacket deformation, the cable clamp 447 defines a receiving space 483 (FIG. 41) between the first set of cable gripping teeth 481 and the second set of cable gripping teeth 482. The receiving space 483 is configured to receive deformed cable jacketing when the cable clamp 447 is clamped onto the optical fiber cable 434. As explained more fully below the teeth 481, 482 are configured to transfer tension on the cable 434 through the cable clamp 447 to the inner housing 440.

As shown, in FIG. 36, the front end portion of the cable clamp 447 is configured to receive the rear end portion of the plug 430. Referring to FIGS. 47A and 47B, in an exemplary embodiment, the front end portion of the cable clamp 447 comprises a non-circular socket 499 and the optical fiber plug 430 comprises a non-circular section 431 configured to be received in the non-circular socket, whereby relative rotation between the cable clamp and the plug is inhibited. The non-circular socket 499 forms a keying feature that engages the plug 430 so has to inhibit relative rotation between the cable clamp 447 and the plug 430.

The outer perimeter of the cable clamp 447 also comprises a keying feature for inhibiting relative rotation between the cable clamp 447 and the inner housing 440. In the illustrated embodiment, the keying feature comprises a pair of longitudinal keyways 485 configured to slidably engage the inner perimeter of the inner housing 440 as described more fully below.

The inner housing 440 comprises an annular wall extending from a front end portion to a rear end portion along the longitudinal axis LA4. The inner housing 440 has an interior passage 454 extending longitudinally from the front end portion through the rear end portion thereof. The interior passage 454 is sized and arranged to allow insertion of the optical fiber plug 430 forward along the longitudinal axis LA4 through the passage to field-load the inner housing 440 onto the optical fiber cable 434. The front end portion of the inner housing 440 is configured to be inserted forwardly into the bulkhead adapter 412. As shown in FIG. 40 the front end portion of the inner housing defines an alignment keyway 452 configured to slidably receive the alignment key 426 of the bulkhead adapter 412. The keyway 452 and key 426 generally allow for insertion of the front end portion of the inner housing 440 in an aligned circumferential orientation about the longitudinal axis LA4 and block insertion of the inner housing into the bulkhead adapter at other circumferential orientations with respect to the longitudinal axis.

The inner housing 440 is configured to receive the cable clamp 447 inside when inserted into the bulkhead adapter 412. Referring to FIGS. 48-49, the illustrated inner housing 440 comprises a pair of longitudinal cable clamp keys 461 configured to be slidably received in the keyways 485 of the cable clamp 447 when the cable clamp is operatively received in the inner housing. The keys 461 and keyways 485 comprise complementary keying features that engage one another to inhibit relative rotation between the inner housing 440 and cable clamp 447. As can be seen, if the keyway 485 is consider the first keying feature of the cable clamp 447, the cable clamp 447 also possesses a second keying feature comprises of the non-circular opening 499 for engaging the plug 430 to inhibit relative rotation between the plug and the cable clamp. Together, the first and second keying features 485, 499 of the cable clamp 447 and the complementary keying features of the inner housing 440 and the plug 430 inhibit twisting of the optical fiber cable 434 in relation to both the optical fiber plug and the inner housing.

Referring to FIGS. 36, 40, and 42, the inner housing 440 comprises an internal forward-facing annular shoulder 459 configured to engage the rear end of the cable clamp 447 when the cable clamp is installed and the inner housing 460 and the inner housing is inserted forwardly into the bulkhead adapter 412. During use, when tension is imparted on the cable 434, it is transferred through the cable clamp 447 to the internal shoulder 459. Hence, the cable clamp 447 is configured to transfer tension on the cable 434 to the inner housing 440.

The inner housing 440 also comprises a first rearward facing outer annular shoulder 453 configured to stop against the outer housing 442. As explained more fully below, the shoulder 453 can transfer tension from the inner housing 440 to the outer housing 442.

The rear end section of the inner housing 440 is externally threaded. Immediately in front of the threaded section, the outer perimeter of the inner housing defines a bearing surface 455. And immediately in front of the bearing surface 455, the inner housing 440 defines a second rearward facing outer annular shoulder 457. The second shoulder 457 has an outer diameter that is less than the outer diameter of the first shoulder 453.

Referring to FIGS. 36, 37 and 40, the outer housing 442 comprises an annular wall extending along the longitudinal axis from a front end portion to a rear end portion. The outer housing 442 has an interior passage 478 extending longitudinally from the front end portion through the rear end portion thereof. The interior passage 478 is sized and arranged to allow insertion of the optical fiber plug 430 forward along the longitudinal axis LA4 through the passage to field-load the outer housing 442 onto the optical fiber cable 434. The front end portion of the outer housing 442 suitably comprises an internal bayonet coupling slot 463 for making a bayonet connection to the bulkhead adapter 412. The rear end portion of the outer housing 442 has a short section of internal thread 465. The outer housing 442 can be threaded onto the inner housing 440 until the thread 465 reaches the bearing surface 455, at which point the outer housing can freely rotate on the inner housing with the thread 465 bearing against the bearing surface 455. In this positon, the first rearward facing outer annular shoulder 453 of the inner housing 440 can engage an internal forward facing shoulder 467 of the outer housing 442. Hence, during use, when tension is imparted on the cable 334, it is transferred via the cable clamp 447 to the inner housing 440, from the inner housing to the outer housing 442, and from the outer housing to the bulkhead adapter 412. This configuration inhibits tension from being imparted on the plug 430 and receptacle 428, protecting the integrity of the optical connection.

Referring to FIGS. 32 and 36, the illustrated cable seal assembly 444 comprises a compressible cable seal 460 (also called a grommet), a collet 462, and a seal nut 464. Each of the cable seal assembly components 460, 462, 464 is field-installable onto the plug terminated cable 434. The compressible cable seal 460 and the collet 462 are configured to be coupled together on the cable 434 to limit relative movement between the collet and the cable seal along the longitudinal axis LA4. The two-part sub-assembly of the seal 460 and collet 462 is configured to be inserted forwardly along the cable 434 into the rear end portion of the inner housing 440 until an outer flange of the collet engages the rear end of the inner housing. In this position, the front end portion of the compressible cable seal 460 is configured to sealingly engage the inner perimeter of the inner housing 440, thereby sealing the interface between the cable seal assembly 444 and the inner housing. The seal nut 464 comprises a forward facing inner annular chamfer 476, and the rear end portion of the collet 462 comprises bendable collet fingers 470. The seal nut 464 is configured to be threadably tightened onto the rear end portion of the inner housing 442. As the nut 464 is tightened the inner chamfer 476 bears against the rear end of the collet fingers 470 to deflect the collet fingers radially inward and thereby compress the compressible cable seal 460 against the cable 434 to seal the interface between the cable seal assembly 444 and the cable 434.

Figure 33A:
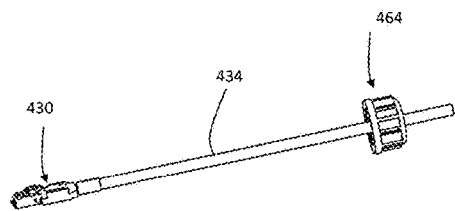
Figure 33B:
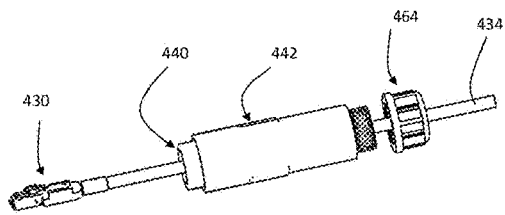
Figure 33C:
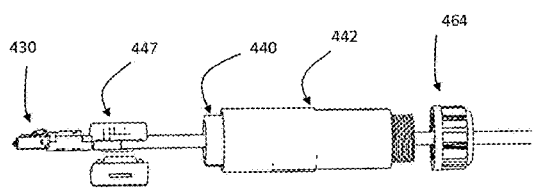
Figure 33D:
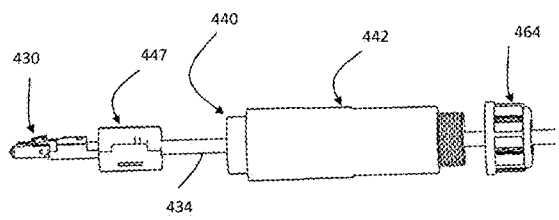
Figure 33E:
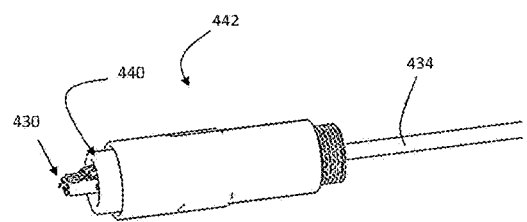
Figure 33F:
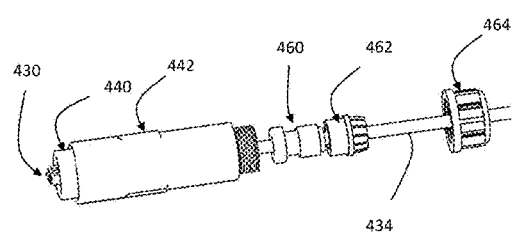
Figure 33G:
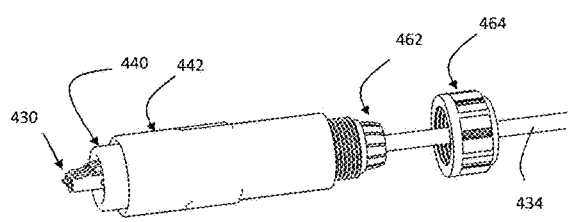
Figure 33H:
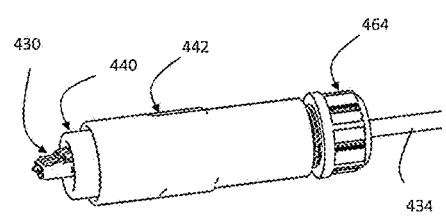
Figure 33I:
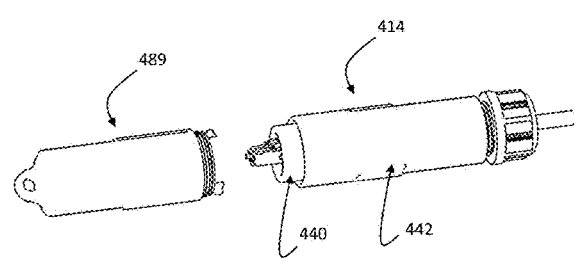
Figure 33J:
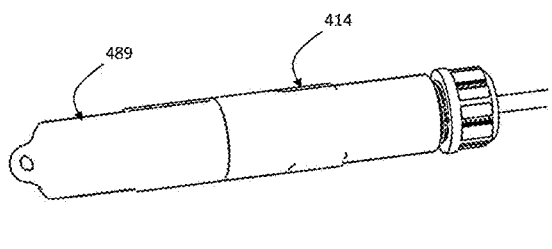

Referring to FIGS. 33A-33J, an exemplary method of field-installing the rugged optical fiber connector assembly 314 will now be briefly described. As shown in FIG. 33A, initially the plug 430 is inserted forwardly through the seal nut 464. Next, as shown in FIG. 33B, the plug 430 is inserted forwardly through the inner housing 440 and outer housing 442. Next, as shown in FIGS. 33C and 33D, the cable clamp 447 is installed on the cable 434 at the rear end portion of the plug 430. The clamp 447 is installed such that the front end portion of the cable clamp receives the rear end portion of the plug 430 in the non-circular opening 499 to limit rotation of the plug in relation to the cable clamp. The clamp 447 is also installed so that the gripping teeth 481, 482 bite into the cable jacket to make a tight, clamped connection. Once the clamp 447 is installed, tension on the cable 434 will be transferred to the cable clamp 447. Next, as shown in FIG. 33E, the inner and outer housings 440, 442 are moved forward along the cable until the forward facing internal shoulder 459 bottoms out against the rear end of the cable clamp 447. Next, as shown in FIG. 33F, the cable seal 460 and collet 462 are loaded onto the cable 434 between the inner housing 440 and the seal nut 464. Next, as shown in FIG. 33G, the cable seal 460 and collet 462 are inserted forwardly into the rear end portion of the inner housing 440. Next has shown in FIG. 33H, the seal nut 464 is tightened to compress the cable seal 460 and seal the interface between the ingress-protected housing assembly 432 and the cable 434. Next as shown in FIGS. 33I and 33J, a dust cap 489 can be installed on the ingress-connected connector assembly 414.

Figure 34A:
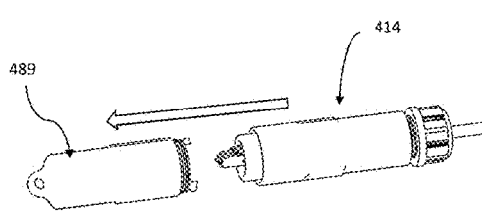
Figure 34B:
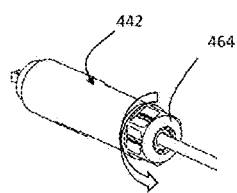
Figure 34C:
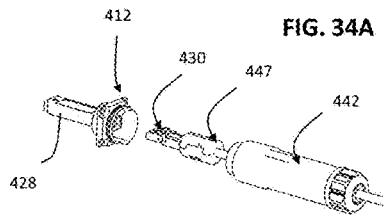
Figure 34D:
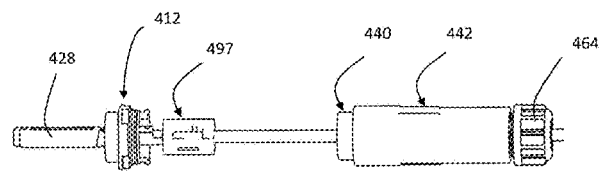
Figure 34E:
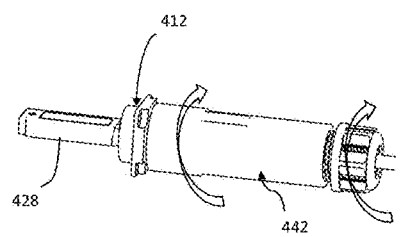

Referring to FIGS. 34A-34E, an exemplary method of making an optical connection using the ingress-protected connector assembly 414 will now be briefly described. First, as shown in FIG. 34A, the dust cap 489 is removed. Next, as shown in FIG. 34B, the seal nut 646 is disconnected from the inner housing 440. Next, as shown in FIG. 34C, the ingress-protected housing assembly 432 is retracted rearward in relation to the plug 430 and the cable clamp 447. Next as shown in FIG. 34D, the plug 430 is mated with a receptacle 428 at a bulkhead adapter 412. Next, as shown in FIG. 34E, the outer housing 442 is used to make a bayonet connection (broadly, a rotational connection) to the bulkhead adapter 412, and then the seal nut 464 is tightened onto the inner housing 440 to make the cable seal. In this configuration, the cable clamp 447 acts to transfer tension to the inner housing 440, the inner housing acts to transfer tension to the outer housing 442, and the outer housing acts to transfer tension to the bulkhead adapter 412 as explained above. In addition, the cable clamp 447 prevents twisting of the cable 434 along the ingress-protected connector assembly 114 by inhibiting relative rotation between the plug 430, the cable clamp 447, and the inner housing 440 in the manner described above. The inventors believe that this mitigation of cable twisting can improve the durability and usable lifespan of the compressible cable seal 462 by reducing friction and torsional strain on the cable seal during use.

Figure 35A:
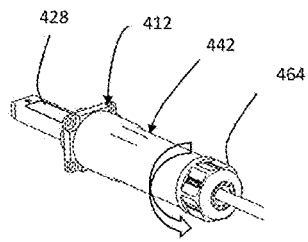
Figure 35B:
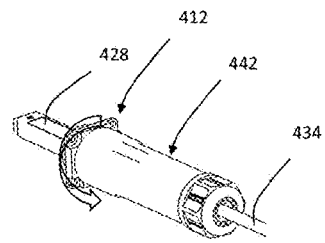
Figure 35C:
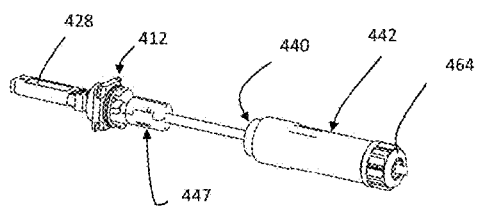
Figure 35D:
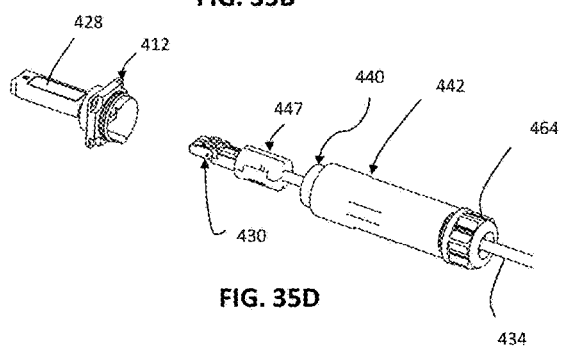

Referring to FIGS. 35A-35D, an exemplary embodiment of a method of disconnecting the ingress-protected connector assembly 414 will now be briefly described. First, as shown in FIG. 35A, the cable seal nut 464 is disconnected. Next, as shown in FIG. 35B, the outer housing 442 is disconnected from the bulkhead adapter 412. Next, as shown in FIG. 35C, the housings 440, 442 are pulled away from the adapter 412. Last, as shown in FIG. 35D, the plug 430 is unlatched from the receptacle 428 and removed.

Referring to FIGS. 55-61, another embodiment of an ingress-protected bulkhead connection system in accordance with the present disclosure is generally indicated at reference number 510. The connection system 510 broadly comprises a bulkhead adapter 512 and an ingress-protected fiber optic connector assembly 514 for being operatively connected to the bulkhead adapter, in the illustrated embodiment, by a bayonet connection. As with the fiber optic connector assembly 414, the fiber optic connector assembly 514 is configured to effectively transfer tension to the bulkhead adapter 512 during use.

The ingress-protected connector assembly 514 broadly comprises an optical fiber plug 530 and an ingress-protected housing assembly 532. The optical fiber plug 530 can have any of the features of the optical fiber plug 130 described above. The ingress-protected housing assembly 532 is broadly configured to couple to the bulkhead adapter 512 to enclose the optical fiber plug 532 and seal the interface between the bulkhead adapter and the cable 534. In the illustrated embodiment, the bulkhead adapter 512 comprises an O-ring gasket that is configured to sealingly engage the housing assembly 532 to seal the interface between the bulkhead adapter and the connector assembly 514. The housing assembly 532 comprises an inner housing 540, an outer housing 542, a cable seal assembly 544, and a cable clamp assembly 547, the features of which will be described in further detail below. As above, the entire ingress-protected housing assembly 532 is field-installable onto the plug-terminated cable 534.

The ingress-protected connector assembly 514 has a longitudinal axis LA5. The inner housing 540 has a front end portion and a rear end portion spaced apart along the longitudinal axis LA2. The front end portion of the inner housing 540 is configured to be inserted into the bulkhead adapter 512. The outer housing 542 comprises an annular wall extending along the longitudinal axis LA5 form a front end portion to a rear end portion. The front end portion of the outer housing 542 is configured to make a bayonet connection to the bulkhead adapter 512. The rear end portion of the outer housing 542 is externally threaded. The inner housing 540 is configured to be received in the outer housing 542 such that the outer housing is rotatable about the inner housing (circumferentially about the longitudinal axis LA5).

The illustrated cable seal assembly 544 comprises a compressible cable seal 560 and collet 562. The compressible cable seal 560 and the collet 562 are configured to be coupled together on the cable 534 to limit relative movement between the collet and the cable seal along the longitudinal axis LA5. The two-part sub-assembly of the seal 560 and collet 562 is configured to be inserted forwardly along the cable 534 into the rear end portion of the outer housing 542 until an outer flange of the collet engages the rear end of the outer housing. In this position, the front end portion of the compressible cable seal 560 is configured to sealingly engage the inner perimeter of the outer housing 542, thereby sealing the interface between the cable seal assembly 544 and the outer housing 542. During use, the bayonet connection between the outer housing 542 and the bulkhead adapter 512 can be made first before inserting the cable seal 560 and collet 562 into the outer housing 542.

The cable clamp assembly 547 comprises a dual-function cable gripping member 591 comprising a front seal actuating portion configured for deflecting the deflectable portion of the collet 562 and a rear clamping portion configured for being deformed to clamp onto the optical fiber cable. Suitably, the dual-function cable gripping member 591 is formed from two shell pieces that attach to one another to from an annular wall about the cable 534. The front end portion of the dual-function cable gripping member 591 is internally threaded for threadably connecting to the rear end portion of the outer housing 542. The dual-function cable gripping member 591 is internally threaded and comprises a forward-facing inner annular chamfer 593. When dual-function cable gripping member 591 is threadably tightened onto the outer housing 542, the forward-facing inner annular chamfer 593 bears against the deflectable fingers of the collet 562 to bend the fingers radially inward and compress the cable seal onto the optical fiber cable 534.

The rear end portion of the dual-function cable gripping member 591 defines a set of radially bendable clamping fingers 592 (broadly, a clamping portion). The clamping fingers 592 are similar to the fingers of the collet 562, except that they are configured for directly engaging and tightly clamping against the cable jacket. Between the front end portion and the rear end portion the dual-function cable gripping member 591 is externally threaded. The cable clamp assembly 547 further comprises an internally threaded clamping nut 594 configured to be threadably tightened onto the dual function cable gripping member and a push ring 595 comprising a forward facing internal chamfer 596. The clamping nut 565 is configured to be threadably tightened onto the dual function cable gripping member 591 to forwardly advance the push ring 595 so that the forward-facing inner annular chamfer 596 bears against the radially bendable fingers 592 and bends the bendable fingers radially inward to clamp a jacket of the optical fiber cable 534.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. An optical fiber connector assembly comprising:
    an optical fiber plug configured for terminating an optical fiber cable and for mating with a receptacle at a bulkhead adapter; and
    a rugged housing assembly configured to couple to the bulkhead adapter and enclose the optical fiber plug mated with the receptacle, the rugged housing assembly comprising a housing configured to mate with the bulkhead adapter, a cable seal configured to be coupled to the optical fiber cable and seal an interface between the housing and the optical fiber cable, and a non-sealing cable clamp configured to clamp onto the optical fiber cable such that movement of the optical fiber cable in relation to the cable clamp is inhibited, the cable clamp configured to be housed within the housing and interface with the housing such that, when the optical fiber plug is mated with the receptacle and the housing is coupled to the bulkhead adapter, tension on the cable is transferred via the cable clamp to the bulkhead adapter and transfer of tension to the optical fiber plug and receptacle is inhibited,
    wherein the cable clamp comprises a first keying feature for keying the cable clamp in relation to the housing to inhibit relative rotation between the cable clamp and the housing.

2. The optical fiber connector assembly of claim 1, wherein
    the cable clamp is configured to inhibit twisting of the optical fiber cable in relation to both the optical fiber plug and the housing.

3. The optical fiber connector assembly as set forth in claim 1, wherein
    the first keying feature comprises a longitudinal keyway, the housing comprising a complementary feature comprising a longitudinal key configured to be slidably received in the longitudinal keyway.

4. The optical fiber connector assembly as set forth in claim 1, wherein
    further comprises a nut configured to be threadably tightened onto a rear end portion of the housing to compress the cable seal against the optical fiber cable.

5. The optical fiber connector assembly as set forth in claim 1, wherein
    the cable clamp further comprises a second keying feature for keying the cable clamp in relation to the optical fiber plug to inhibit relative rotation between the cable clamp and the optical fiber plug.

6. The optical fiber connector as set forth in claim 2, wherein
    the cable clamp further comprises a keying feature comprising a non-circular socket and the optical fiber plug comprises a non-circular section configured to be received in the non-circular socket, whereby relative rotation between the cable clamp and the plug is inhibited.

7. The optical fiber connector as set forth in claim 1, wherein
    the cable clamp comprises a first and second clamp shell pieces configured to be coupled together for clamping onto the optical fiber cable.

8. The optical fiber connector as set forth in claim 7, wherein
    the first and second clamp shell pieces are configured to be coupled together for clamping onto any of a plurality of different optical cables within a cable size range.

9. The optical fiber connector as set forth in claim 8, wherein
    the cable size range extends from at least a minimum cable outer diameter of 4.8 mm to at least a maximum cable diameter of 6.0 mm.

10. The optical fiber connector as set forth in claim 7, wherein
    the cable clamp has a front end portion and a rear end portion spaced apart along a longitudinal axis of the optical fiber connector.

11. The optical fiber connector as set forth in claim 10, wherein
    the cable clamp comprises a first set of cable gripping teeth at a first location along the longitudinal axis and a second set of cable gripping teeth at a second location along the longitudinal axis spaced apart from the first location.

12. The optical fiber connector as set forth in claim 11, wherein
    the cable clamp defines a receiving space between the first set of cable gripping teeth and the second set of cable gripping teeth, the receiving space configured to receive deformed cable jacketing when the cable clamp is clamped onto the optical fiber cable.

13. The optical fiber connector as set forth in claim 1, wherein
    the rugged housing assembly is field-installable onto the optical fiber cable.

14. The optical fiber connector as set forth in claim 1, wherein the housing includes an inner housing configured to accommodate optical fiber plug and an outer housing configured to make a rotational connection to the bulkhead adapter.

15. The optical fiber connector as set forth in claim 14, wherein
the inner housing comprises an inner shoulder and an outer shoulder and the outer housing comprises an inner shoulder, when tension is imparted on the cable, the cable configured to engage rearward against the inner shoulder of the inner housing and the outer shoulder of the inner housing configured to engage rearward against the inner shoulder of the outer housing, whereby tension on the cable is transferred from the cable clamp to the inner housing and from the inner housing to the outer housing.

16. An optical fiber connector comprising:
an optical fiber plug configured for terminating an optical fiber cable and for mating with a receptacle at a bulkhead adapter; and
a rugged housing assembly configured to couple to the bulkhead adapter and enclose the optical fiber plug mated with the receptacle, the rugged housing assembly comprising a housing configured to mate with the bulkhead adapter, a cable seal configured to be coupled to the optical fiber cable and seal an interface between the housing and the optical fiber cable, and a non-sealing cable clamp configured to clamp onto the optical fiber cable such that movement of the optical fiber cable in relation to the cable clamp is inhibited, the cable clamp configured to be housed within the housing and interface with the housing such that, when the optical fiber plug is mated with the receptacle and the housing is coupled to the bulkhead adapter, tension on the cable is transferred via the cable clamp to the bulkhead adapter and transfer of tension to the optical fiber plug and receptacle is inhibited,
wherein the rugged housing assembly further comprises:
a collet including a deflectable portion configured for compressing the cable seal onto the optical fiber cable.

17. The optical fiber connector assembly as set forth in claim 16, further comprising
a nut configured to be threadably tightened onto a rear end portion of the housing to compress the cable seal against the optical fiber cable.

18. The optical fiber connector assembly as set forth in claim 16, wherein
the cable clamp comprises a first and second clamp shell pieces configured to be coupled together for clamping onto the optical fiber cable.

19. The optical fiber connector assembly as set forth in claim 16, wherein
the rugged housing assembly is field-installable onto the optical fiber cable.

20. The optical fiber connector assembly as set forth in claim 16, wherein
the housing includes an inner housing configured to accommodate the optical fiber plug and an outer housing configured to make a rotational connection to the bulkhead adapter.

\* \* \* \* \*